United States Patent
Chen

(10) Patent No.: US 9,285,887 B2
(45) Date of Patent: Mar. 15, 2016

(54) GESTURE RECOGNITION SYSTEM AND GESTURE RECOGNITION METHOD THEREOF

(71) Applicant: LITE-ON TECHNOLOGY CORPORATION, Taipei (TW)

(72) Inventor: Jau-Yu Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/514,754

(22) Filed: Oct. 15, 2014

(65) Prior Publication Data

US 2015/0177844 A1 Jun. 25, 2015

(30) Foreign Application Priority Data

Dec. 19, 2013 (TW) .............................. 102147134 A

(51) Int. Cl.
| | | |
|---|---|---|
| G06K 9/00 | (2006.01) | |
| G06F 3/01 | (2006.01) | |
| G06T 7/00 | (2006.01) | |
| G06T 7/20 | (2006.01) | |

(52) U.S. Cl.
CPC .............. G06F 3/017 (2013.01); G06T 7/0057 (2013.01); G06T 7/20 (2013.01); G06T 2200/04 (2013.01); G06T 2207/30196 (2013.01)

(58) Field of Classification Search
None
See application file for complete search history.

(56) References Cited

U.S. PATENT DOCUMENTS

| | | | | |
|---|---|---|---|---|
| 7,340,077 B2 * | 3/2008 | Gokturk | .................. | G06F 3/017 348/208.14 |
| 9,128,528 B2 * | 9/2015 | Tian | ........................ | G06F 3/017 |
| 2012/0235903 A1 * | 9/2012 | Im | ........................... | G06F 3/005 345/158 |
| 2013/0155396 A1 * | 6/2013 | Deliwala | ............... | G01J 1/0242 356/138 |
| 2015/0177844 A1 * | 6/2015 | Chen | ....................... | G06F 3/017 348/77 |
| 2015/0186707 A1 * | 7/2015 | Joo | .................... | G06K 9/00389 382/103 |

* cited by examiner

*Primary Examiner* — Tahmina Ansari
(74) *Attorney, Agent, or Firm* — Li & Cai Intellectual Property (USA) Office

(57) ABSTRACT

A gesture recognition system is disclosed. The gesture recognition system comprises at least one lighting module, at least one angle detecting module, an image capturing module and a gesture information control module. The lighting module is used for emitting a light. The angle detecting module receives a reflected light of the light and accordingly outputs a light sensing signal. The image capturing module is used for capturing at least one 2-D reference image for at least one hand of the user. The distance between the angle detecting module and the image capturing module is a fixed length. The gesture information control module acquires a plurality of angle data according to the light sensing signal and the 2-D reference image to calculate at least one depth data for at least one hand according to the plurality of angle data and the fixed length, so as to recognize the gestures.

32 Claims, 15 Drawing Sheets

GESTURE RECOGNITION SYSTEM AND GESTURE RECOGNITION METHOD THEREOF

BACKGROUND OF THE INVENTION

1. Field of the Invention

The instant disclosure relates to a gesture recognition system; in particular, to a gesture recognition system for transforming angle data of two-dimensional images into depth data so as to recognize gestures.

2. Description of Related Art

With the computer technology developed faster and faster, both the software system and the hardware system continuously have progressed, for example, the applications in the software system have developed from simple and basic functions into novel and complex functions. When the user tends to use certain applications or function items, the user needs to choose the item intended to be used via the computer screen and move the mouse indicator to where the item is located for executing. After that, the computer system starts to execute the application or function item.

When the user operates the computer system, computer/TV games, information appliances and the like, the user needs to utilize an human machine interface (HMI) to give an instruction to the the computer system, computer/TV games, information appliances and the like, and would also acquire the result generated by the computer system, computer/TV games, information appliances and the like via the human machine interface (HMI). With the technology developed, more and more kinds of communication means between the user and the computer system, computer/TV games, information appliances and the like have been developled. In other words, via an human machine interface, the information from the user is not limited in instructions that are given via a keyboard or mouse. There are many kinds of human machine interfaces that allow input means of voice, hand writing or gestures becoming popular with people.

In the prior, the current two-dimensional camera image gesture control system can merely provide two-dimensional image data for identifying user's operation instructions, and thus it can not provide the relevant depth data. Often, it needs two or more cameras to acquire the depth data, which may result in a huge load of system caciculation, more power consumption and high cost. Therefore, generally, the conventional gesture control is operated in a two-dimensional space, which limits the application thereof.

SUMMARY OF THE INVENTION

The instant disclosure provides a gesture recognition system, which recognizes single-hand gestures. The gesture recognition system comprises a first lighting module, an angle detecting module, an image capturing module and a gesture information control module. The first lighting module emits a first light according to a first lighting control signal wherein the first light has a first light illumination range. The angle detecting module receives a first reflection light of the first light according to an angle detecting control signal, and outputs a light sensing signal according to the first reflection light, wherein the first reflection light is generated from the reflection resulted when the first light illuminates the single hand. The image capturing module captures at least one two-dimensional reference image of the single hand, and outputs the two-dimensional reference image, wherein the distance between the angle detecting module and the image capturing module is a fixed length. The gesture information control module is electrically connected to the first lighting module, the image capturing module and the angle detecting module. The gesture information control module acquires a first angle reference data and a second angle reference data respectively according to the light sensing signal and the two-dimensional reference image. The gesture information control module calculates a depth data and a horizontal displacement data of the single hand according to the first angle reference data, the second angle reference data and the fixed length, so as to recognize single-hand gestures. The gesture information control module respectively transmits the first lighting control signal and the angle detecting control signal to the first lighting module and the angle detecting module.

The instant disclosure provides another gesture recognition system which recognizes two-hands gestures. The gesture recognition system comprises a first lighting module, a third lighting module, a first angle detecting module, a second angle detecting module, an image capturing module and a gesture information control module. The first lighting module emits a first light according to a first lighting control signal, wherein the first light has a first light illumination range. The third lighting module emits a third light according to a third lighting control signal, wherein the third light has a third light illumination range. The first angle detecting module receives a first reflection light of the first light according to a first angle detecting control signal, and outputs a first light sensing signal according to the first reflection light, wherein the first reflection light is generated from the reflection resulted when the first light illuminates the first hand. The second angle detecting module receives a third reflection light of the third light according to a second angle detecting control signal, and outputs a second light sensing signal according to the third reflection light, wherein the third reflection light is generated from the reflection resulted when the third light illuminates the second hand. The image capturing module captures at least one two-dimensional reference image of the first hand and the second hand, and outputs the two-dimensional reference image, wherein the distance between the first angle detecting module and the image capturing module is a first fixed length and the distance between the second angle detecting module and the image capturing module is a second fixed length. The gesture information control module is electrically connected to the first lighting module, the third lighting module, the first angle detecting module, the second angle detecting module and the image capturing module. The gesture information control module acquires a first angle reference data and a second angle reference data respectively according to the first light sensing signal and the two-dimensional reference image and acquires a third angle reference data and a fourth angle reference data respectively according to the second light sensing signal and the two-dimensional reference image. The gesture information control module calculates a first depth data and a first horizontal displacement data of the first hand according to the first angle reference data, the second angle reference data and the first fixed length and calculates a second depth data and a second horizontal displacement data of the second hand according to the third angle reference data, the fourth angle reference data and the second fixed length, so as to recognize gestures of the first hand and the second hand. The gesture information control module respectively transmits the first lighting control signal, the third lighting control signal, the first angle detecting control signal and the second angle detecting control signal to the first lighting module, the third lighting module, the first angle detecting module and the second angle detecting module.

The instant disclosure further provides a gesture recognition method, used in a gesture recognition system for recognizing single-hand gestures. The gesture recognition system comprises a first lighting module, an angle detecting module, an image capturing module and a gesture information control module. The gesture information control module is electrically connected to the first lighting module, the image capturing module and the angle detecting module. The gesture recognition method comprising: emitting a first light by the first lighting module according to a first lighting control signal wherein the first light has a first light illumination range; receiving a first reflection light of the first light by the angle detecting module according to an angle detecting control signal, and outputting a light sensing signal according to the first reflection light wherein the first reflection light is generated from the reflection resulted when the first light illuminates the single hand; capturing at least one two-dimensional reference image and outputting the two-dimensional reference image of the single hand by the image capturing module wherein the distance between the angle detecting module and the image capturing module is a fixed length; acquiring a first angle reference data and a second angle reference data by the gesture information control module respectively according to the light sensing signal and the two-dimensional reference image; and calculating a depth data and a horizontal displacement data of the single hand by the gesture information control module according to the first angle reference data, the second angle reference data and the fixed length, so as to recognize single-hand gestures. Particularly, the gesture information control module respectively transmits the first lighting control signal and the angle detecting control signal to the first lighting module and the angle detecting module.

The instant disclosure further provides another gesture recognition method, used in a gesture recognition system for recognizing two-hands gestures. The gesture recognition system comprises a first lighting module, a third lighting module, a first angle detecting module, a second angle detecting module, an image capturing module and a gesture information control module. The gesture information control module is electrically connected to the first lighting module, the third lighting module, the first angle detecting module, the second angle detecting module and the image capturing module. The gesture recognition method comprises: emitting a first light by the first lighting module according to a first lighting control signal wherein the first light has a first light illumination range; emitting a third light by the third lighting module the according to a third lighting control signal wherein the third light has a third light illumination range; receiving a first reflection light of the first light by the first angle detecting module according to a first angle detecting control signal, and outputting a first light sensing signal according to the first reflection light wherein the first reflection light is generated from the reflection resulted when the first light illuminates the first hand; receiving a third reflection light of the third light by the second angle detecting module according to a second angle detecting control signal, and outputting a second light sensing signal according to the third reflection light wherein the third reflection light is generated from the reflection resulted when the third light illuminates the second hand; capturing at least one two-dimensional reference image of the first hand and the second hand by the image capturing module, and outputting the two-dimensional reference image wherein the distance between the first angle detecting module and the image capturing module is a first fixed length and the distance between the second angle detecting module and the image capturing module is a second fixed length; acquiring a first angle reference data and a second angle reference data respectively according to the first light sensing signal and the two-dimensional reference image, and acquiring a third angle reference data and a fourth angle reference data respectively according to the second light sensing signal and the two-dimensional reference image from the gesture information control module; and calculating a first depth data and a first horizontal displacement data of the first hand according to the first angle reference data, the second angle reference data and the first fixed length by the gesture information control module, and calculating a second depth data and a second horizontal displacement data of the second hand according to the third angle reference data, the fourth angle reference data and the second fixed length by the gesture information control module, so as to recognize gestures of the first hand and the second hand. In particular, the gesture information control module respectively transmits the first lighting control signal, the third lighting control signal, the first angle detecting control signal and the second angle detecting control signal to the first lighting module, the third lighting module, the first angle detecting module and the second angle detecting module.

To sum up, the gesture recognition system and the gesture recognition method provided by the instant disclosure can transfer the angle reference data of hands into the depth data of hands by an image capturing module that can merely capture two-dimensional reference images. Further, the gesture information control module can acquire the first angle reference data and the second angle reference data respectively according to the light sensing signal and the two-dimensional reference image, so as to calculate the depth data of hands. Therefore, comparing with the prior art, the gesture recognition system provided by the instant disclosure can dramatically reduce the load of system calculation and the cost for designing and manufacturing.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1A:
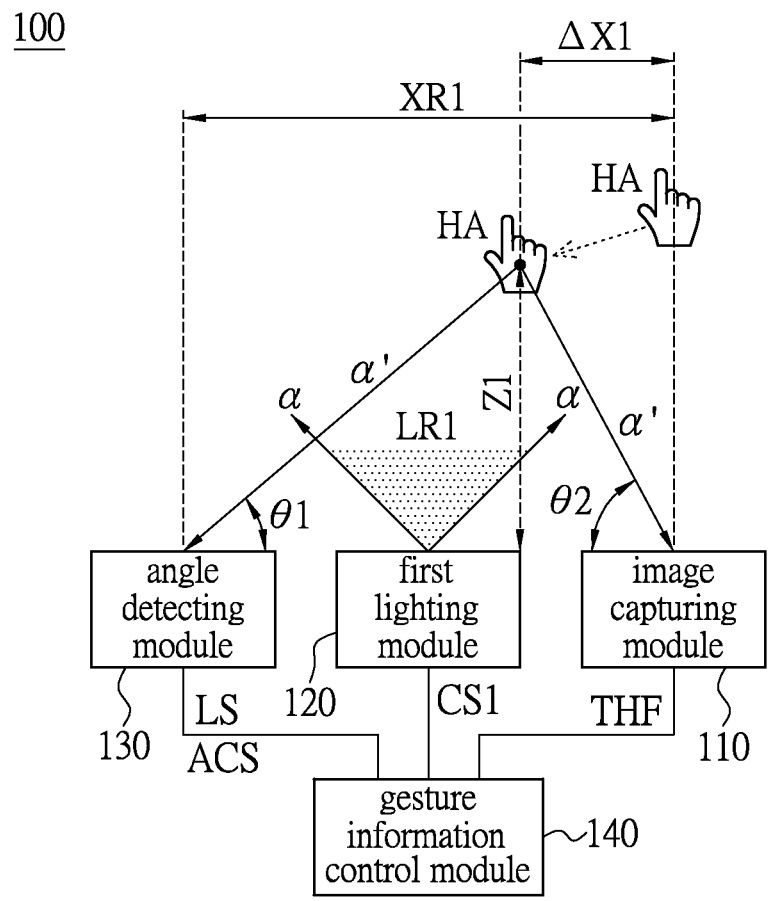
FIG. 1A shows a block diagram of a gesture recognition system for recognizing single-hand gestures according to a embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

The instant disclosure provides a gesture recognition system and a gesture recognition method thereof The gesture recognition system and the gesture recognition method thereof are mainly used in an electric device with an image capturing device, such as a laptop, pad or mobile phone. For example, the image capturing device is configured at the upper side of a display screen or a personal computer system where the user can directly makes a predetermined gesture facing the image capturing device. Afterwards, the computer system implements the application or function item corresponding to this gesture. Thus, it provides the user another input way for a computer system which is more convenient, in addition to the mouse and keyboard originally equipped. In other words, the disclosured systems and methods are for recognizing the user's gesture by the captured images, by replacing input devices such as mouse, keyboard and joystick with hands. Thus, it is more convenient for the user to operate the computer system, computer/TV game, information appliances and the like.

The following embodiments together with drawings are to illustrate the gesture recognition system and the gesture recognition method provided by the instant disclosure; however, the instant disclosure is not limited by the embodiments.

One Embodiment of a Gesture Recognition System for Recognizing Single-Hand Gestures Please refer to FIG. 1A, FIG. 1A shows a block diagram of a gesture recognition system for recognizing single-hand gestures according to a embodiment of the instant disclosure. As shown in FIG. 1A, the gesture recognition system 100 for recognizing single-hand gestures comprises an image capturing module 110, the first lighting module 120, an angle detecting module 130 and a gesture information control module 140. The gesture information control module 140 is electrically connected to the image capturing module 110, the first lighting module 120 and the angle detecting module 130.

Regarding to the image capturing module 110, the image capturing module 110 captures at least one two-dimensional reference image THF of a single hand HA and outputs the two-dimensional reference image THF, wherein the single hand HA is a user's hand (the left one or the right one). The image capturing module 110 may be an infrared image capturing module or an ordinary image capturing module (that is, an image capturing module without the infrared sensing function).

Regarding to the first lighting module 120, the first lighting module 120 emits the first light α according to the first lighting control signal CS1, wherein the first light α has the first light illumination range LR1. In the present embodiment, the first light α may be Infrared light, and the first lighting module 120 may be a Light-Emitting Diode (LED) module.

Regarding to the angle detecting module 130, the angle detecting module 13 is for detecting the angle data of the single hand HA. Specifically, the angle detecting module 130 receives the first reflection light α' of the first light α according to the angle detecting control signal ACS and outputs a light sensing signal LS according to the first reflection light α', wherein the first reflection light α' is generated from the reflection resulted when the first light αilluminates the single hand HA. The distance between the angle detecting module 130 and the image capturing module 110 is a fixed length XR1, wherein the fixed length XR1 is designed by the designer depending on actual needs, which is not limited by the actual numerical values. It is worth mentioning that, in one of embodiments of the instant disclosure, the angle detecting module 130 has an optical wavelength detecting range that is matching the optical wavelength of the first light α, or a light detecting period that is matching the lighting pulse period of the first light α.

Figure 14:
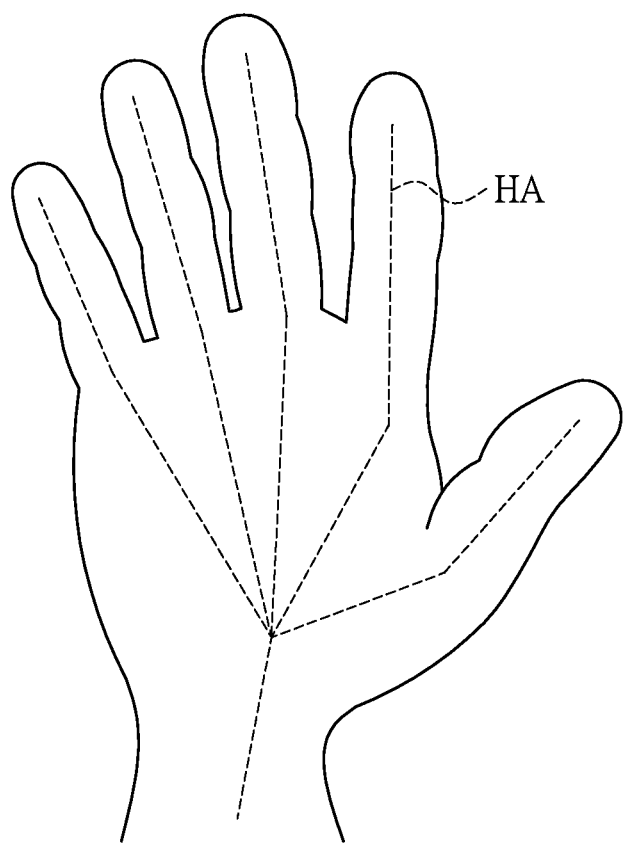
FIG. 14 shows a schematic diagram of the skeleton frame data of a single hand according to an embodiment of the instant disclosure.

Regarding to the gesture information control module 140, the gesture information control module 140 respectively transmits the first lighting control signal CS1 and the angle detecting control signal ACS to the first lighting module 120 and the angle detecting module 130. The gesture information control module 140 acquires the first angle reference data (data relevant to the angle θ1) and the second angle reference data (data relevant to the angle θ2) respectively according to the light sensing signal LS and the two-dimensional reference image THF. Also, the gesture information control module 140 further acquires the skeleton frame data of the single hand HA according to the two-dimensional reference image THF. As shown in FIG. 14, FIG. 14 shows a schematic diagram of the skeleton frame data of a single hand according to an embodiment of the instant disclosure. Moreover, the gesture information control module 140 calculates the depth data Z1 and the horizontal displacement data ΔX1 of the single hand HA according to the first angle reference data, the second angle reference data and the fixed length XR1, so as to recognize single-hand gestures, and further to compare the gestures of the user to the predetermined gesture operation instructions stored in a data base so as to identify the instructions of the user, such that the computer system and computer/TV game can implement the corresponding instructions or software.

In the following description is further instruction in teaching a working principle of the gesture recognition system 100.

When the user makes gestures that give operation instructions to computer system, computer/TV game, information appliances or the like, the gesture recognition system 100 provided by the instant disclosure captures at least one two-dimensional reference image THF of the user's gestures by the image capturing module 110 so as to further recognize gestures of the user, such that the computer system and computer/TV game can implement the corresponding instructions or software. In the prior art, the depth data of the single hand HA can not be acquired by the image capturing module 110 capturing the two-dimensional reference image THF, so the user's gestures can not be effectively recognized. Thus, this embodiment discloses that the angle detecting module 130 receives the reflection light of the single hand HA, and the image capturing module 110 captures the two-dimensional reference image THF for the gesture information control module 140 to calculate the corresponding the first angle reference data and the second angle reference data, and thereby the depth data of the single hand HA is acquired from the first angle reference data and the second angle reference data of the single hand HA and the fixed length XR1.

Figure 2:
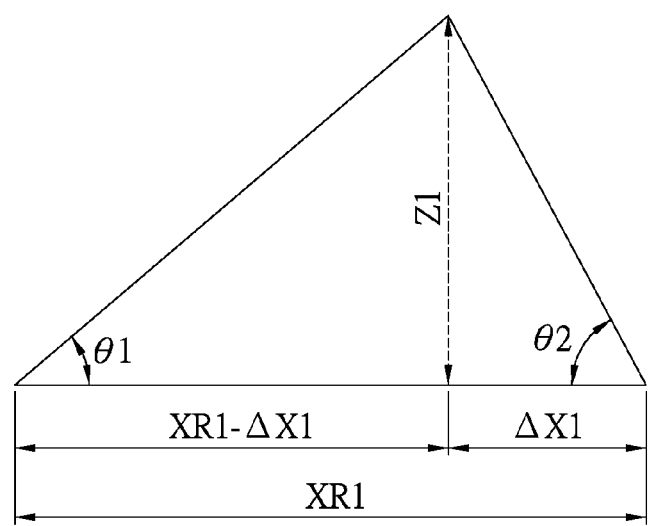
FIG. 2 shows a schematic diagram of a gesture recognition system for calculating the depth data and the horizontal displacement data according to FIG. 1A.

Moreover, in conjunction with FIG. 1A and FIG. 2, FIG. 2 shows a schematic diagram of a gesture recognition system for calculating the depth data and the horizontal displacement data according to FIG. 1A. In the present embodiment, it is assumed that the area where the user's single hand HA moves is within the first light illumination range LR1 of the first light α. The image capturing module 110 captures at least one two-dimensional reference image THF of the single hand HA and transmits the two-dimensional reference image to the gesture information control module 140. At the same time, the first lighting module 120 receives the first lighting control signal CS1 transmitted from the gesture information control module 140 so as to emit the first light α, and the first light α of the instant disclosure has the first light illumination range LR1 as shown in FIG. 1A. When the first light α is emitted by the first lighting module 120 and illuminates the single hand HA, the first reflection light α' is generated because the first light α illuminates the single hand HA. After that, the angle detecting module 130 receives the first reflection light α' of the first light α according to the angle detecting control signal ACS, and transmits the light sensing signal LS to the gesture information control module 140 according to the first reflection light α'. In particular, the angle detecting module 130 has an optical wavelength detecting range that is matching optical wavelength of the first light α or a light detecting period that is matching lighting pulse period of the first light α, so as to avoid the misjudgment of the gesture recognition system 100. Afterwards, the gesture information control module 140 calculates the first angle reference data (relevant to the data of the angle θ1) according to the light sensing signal LS, and the gesture information control module 140 calculates and generates the second angle reference data (relevant to the data of the angle θ2) according to the two-dimensional reference image THF. Further, as shown in FIG. 2, the gesture information control module 140 calculates the depth data Z1 and the horizontal displacement data ΔX1 (that is, the horizontal displacement distance of the single hand, as shown in FIG. 1A) according to the fixed length XR1, the first angle reference data and the second angle reference data and via the simultaneous equations including the equation (1) and the equation (2). In brief, the instant disclosure acquires two angle data of the single hand by the angle detecting module 130 and the image capturing module 110, and transforms the angle data of the single hand into the depth data by the gesture information control module 140.

$$Z1=(XR1-\Delta X1)\times\tan(\theta 1) \qquad \text{equation (1)}$$

$$Z1=(\Delta X1)\times\tan(\theta 2) \qquad \text{equation (2)}$$

Figure 1B:
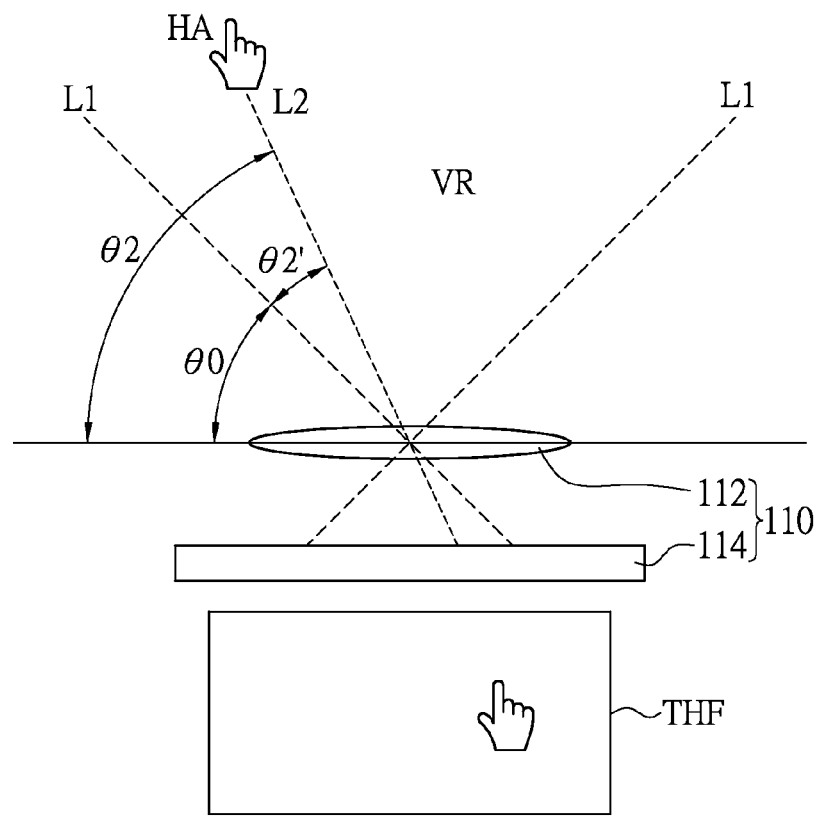
FIG. 1B shows a schematic diagram of an image capturing module for acquiring angle data from the two-dimensional reference image according to an embodiment of the instant disclosure.

It is worth mentioning that, in conjunction with FIG. 1A and FIG. 1B, FIG. 1B shows a schematic diagram of an image capturing module for acquiring angle data from the two-dimensional reference image according to an embodiment of the instant disclosure. In the instant disclosure, the image capturing module 110 comprises a lens 112 and an image sensor 114. The image capturing module 110 has a viewing angle range VR (as the area covered between the two dotted lines L1), and the image capturing module 110 can image the single hand HA within the viewing angle range VR on the image sensor 114, wherein the image capturing module 110 has a preset angle θ0. In a further instruction, the image capturing module 110 captures the two-dimensional reference image THF of the single hand HA and transmits the two-dimensional reference image THF to the gesture information control module 140, wherein the single hand HA corresponding to the two-dimensional reference image THF that would be imaged inside the image sensor 114 according to the dotted line L2. At this time, the gesture information control module 140 calculates the reference angle θ2', the angle formed by the dotted lines L1 and L2, according to the location of the single hand HA in the two-dimensional reference image. After that, the gesture information control module 140 adds the reference angle θ2' to the preset angle θ0 so as to acquire the second angle reference data.

For a specific instruction on an operation process of the gesture recognition system 100 of the instant disclosure, there is at least one of the embodiments for further instruction.

In the following embodiments, there are only parts different from embodiments in FIG. 1A described, and the omitted parts are indicated to be identical to the embodiments in FIG. 1A. In addition, for an easy instruction, similar reference numbers or symbols refer to similar elements.

[Another Embodiment of the Gesture Recognition System for Recognizing Single-Hand Gestures]

Figure 3:
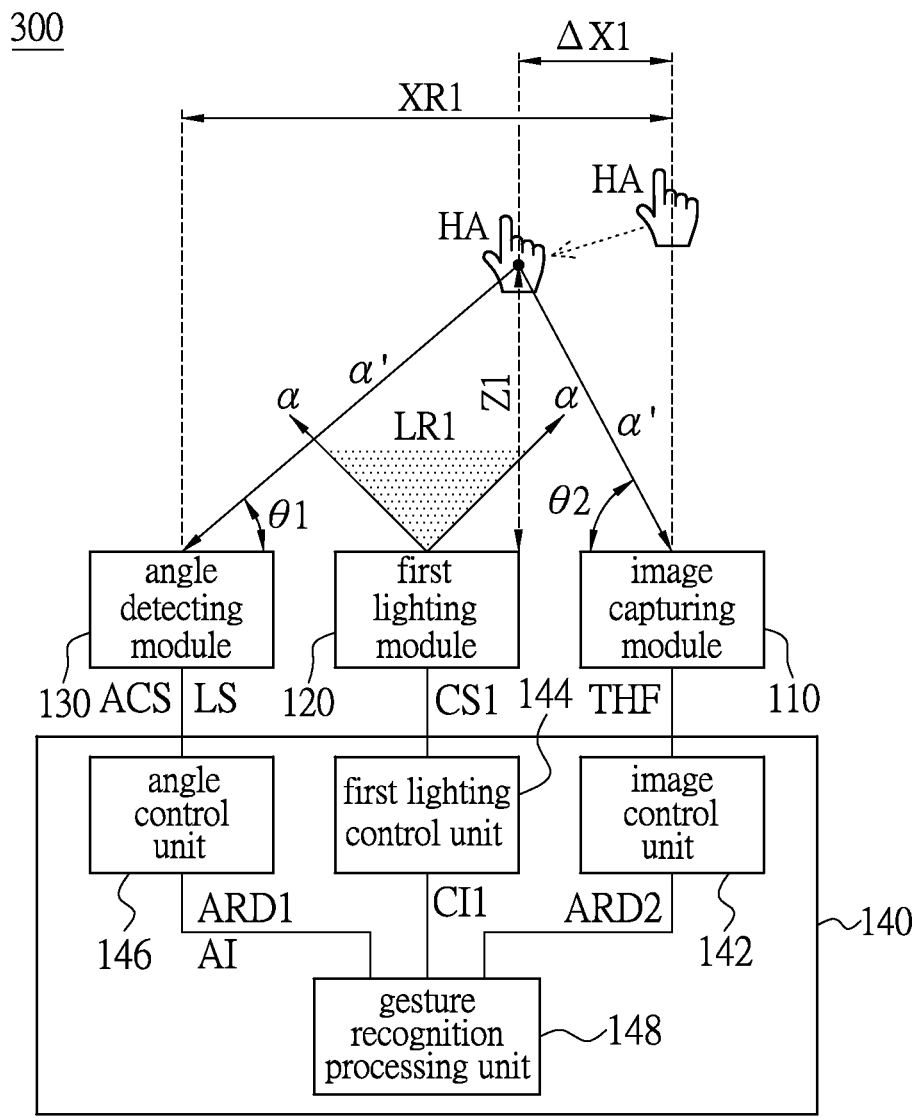
FIG. 3 shows a detailed block diagram of a gesture recognition system according to another embodiment of the instant disclosure.

Please refer to FIG. 3, FIG. 3 shows a detailed block diagram of a gesture recognition system according to another embodiment of the instant disclosure. Different from the embodiment shown in FIG. 1A, in the present embodiment, the information control module 140 of the gesture recognition system 300 comprises an image control unit 142, the first lighting control unit 144, an angle control unit 146 and the gesture recognition processing unit 148. The image control unit 142 is electrically connected to the image capturing module 110, the first lighting control unit 144 is electrically connected to the first lighting module 120, the angle control unit 146 is electrically connected to the angle detecting module 130, and the gesture recognition processing unit 148 is electrically connected to the image control unit 142, the first lighting control unit 144 and the angle control unit 146.

Regarding to the image control unit 142, the image control unit 142 receives the two-dimensional reference image THF and uses images to calculate the second angle reference data ARD2 according to the two-dimensional reference image THF.

Regarding to the first lighting control unit 144, the first lighting control unit 144 outputs the first lighting control signal CS1 according to the first lighting instruction CI1 transmitted from the gesture recognition processing unit 148, so as control the first lighting module 120 to emit the first light α.

Regarding to the angle control unit 146, the angle control unit 146 receives the light sensing signal LS and calculates the first angle reference data ARD1 according to the light sensing signal LS, wherein the angle control unit 146 transmits the angle detecting control signal ACS to the angle detecting module 130 according to the angle detecting instruction AI.

Regarding to the gesture recognition processing unit 148, the gesture recognition processing unit 148 respectively receives the first angle reference data ARD1 and the second angle reference data ARD2 transmitted from the the image control unit 142 and angle control unit 146, and calculates the depth data Z1 and the horizontal displacement data ΔX1 of the single hand HA according to the first angle reference data ARD1, the second angle reference data ARD2 and the fixed length XR1, so as to recognize gestures of the single hand HA. It is worth mentioning that, in the instant disclosure, the gesture recognition processing unit 142 acquires the skeleton frame data of the single hand HA by the two-dimensional reference image THF.

In the following description is further instruction in teaching a working principle of the gesture recognition system 300.

In the present embodiment, the gesture recognition processing unit 148 transmits the first lighting instruction CI1 to the first lighting control unit 144 such that the first lighting control unit 144 transmits the first lighting control signal CS1 to the first lighting module 120, so as to emit the first light α (having a first light illumination range LR1) that illuminates the user's single hand HA. Moreover, the gesture recognition processing unit 148 transmits the angle detecting instruction AI to the angle control unit 146 such that the angle control unit 146 uses the angle detecting control signal ACS to control the angle detecting module 130 for receiving the first reflection light α' generated from the single hand HA illuminated by the first light α, so as to acquire the data of the angle θ1. At the same time, the image capturing module 110 captures at least one two-dimensional reference image THF of the user's single hand HA, and transmits at least one two-dimensional reference image THF of the single hand HA to the image control unit 142 for analysis and calculation. Afterwards, the image control unit 142 receives at lease one two-dimensional reference image THF of the single hand HA transmitted from the image capturing module 110, and the image control unit 142 calculates the second angle reference data ARD2 of the two-dimensional reference image THF (that is, the data of the angle θ2) from the two-dimensional reference image THF. After that, the image control unit 142 transmits the second angle reference data ARD2 to the gesture recognition processing unit 148.

Besides, after the angle detecting module 130 receives the first reflection light α' resulted when the first light α illuminates the first hand HA, the angle detecting module 130 transmits the light sensing signal LS corresponding to the first reflection light α' to the angle control unit 146. It is worth mentioning that, the angle detecting module 130 may be designed to be a functional module that can only receive the first light α so as to avoid circuit malfunction due to receiving other lights. For example, the angle detecting module 130 has an optical wavelength detecting range that is matching optical wavelength of the first light α or a light detecting period that is matching lighting pulse period of the first light α. After that, the angle control unit 146 makes analysis and calculations to acquire the first angle reference data ARD1 (that is, the data of the angle θ1) according to the received light sensing signal LS. Also, the angle control unit 146 transmits the first angle reference data ARD1 to the gesture recognition processing unit 148.

Afterwards, in conjunction with FIG. 2 and FIG. 3, the gesture recognition processing unit 148 calculates the depth data Z1 and the horizontal displacement data ΔX1 of the single hand HA according to the fixed length XR1, the first angle reference data ARD1 and the second angle reference data ARD2 and via the simultaneous equations including the equation (1) and the simultaneous equation (2), so as to determine the gestures of the user's single hand HA. Further, the gesture recognition processing unit 148 compares the user's gestures with the predetermined gesture operation instructions stored in a database according to the two-dimensional reference image THF, the depth data Z1 and the horizontal displacement data ΔX1, so as to identify the instructions of the user, such that the computer system and computer/TV game can implement the corresponding instruction or software.

For a specific instruction on an operation process of the gesture recognition system 300 of the instant disclosure, there is at least one of the embodiments for further instruction.

In the following embodiments, there are only parts different from embodiments in FIG. 3 described, and the omitted parts are indicated to be identical to the embodiments in FIG. 3. In addition, for an easy instruction, similar reference numbers or symbols refer to similar elements.

Figure 4:
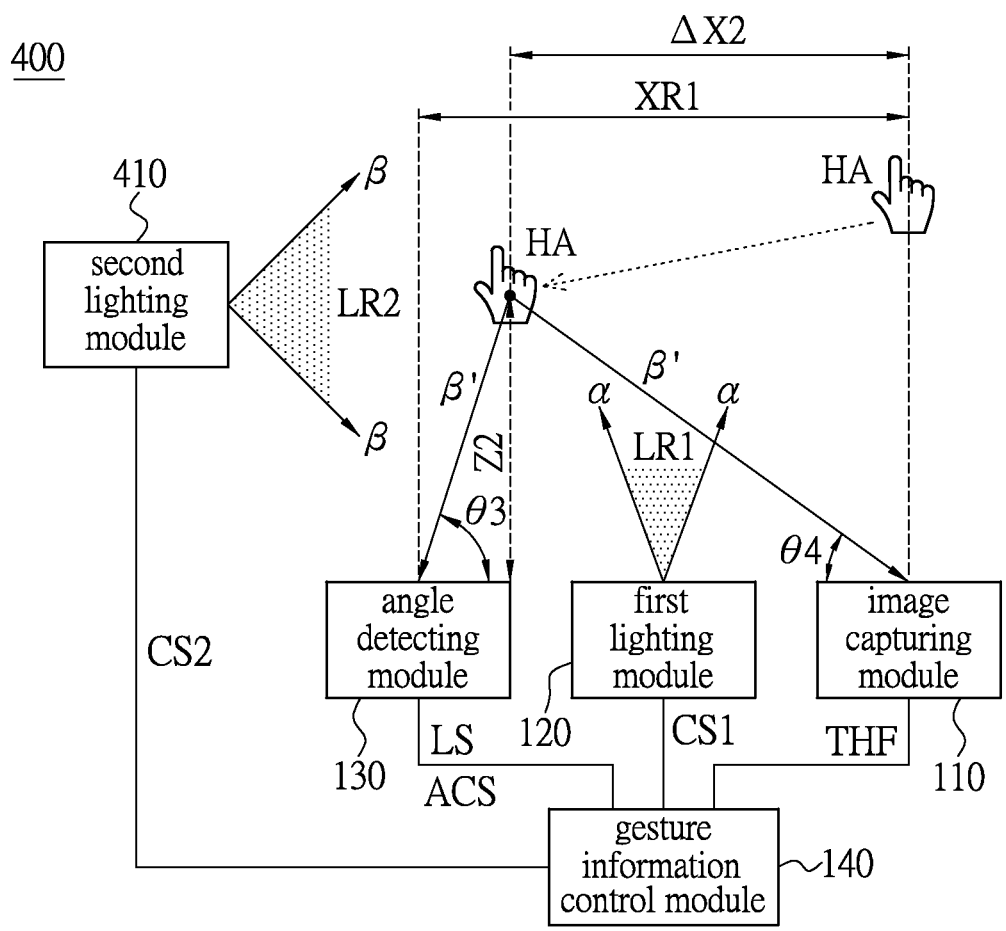
FIG. 4 shows a block diagram of expanding the light illumination range of the gesture recognition system for recognizing single-hand gestures according to a embodiment of the instant disclosure.
Figure 5:
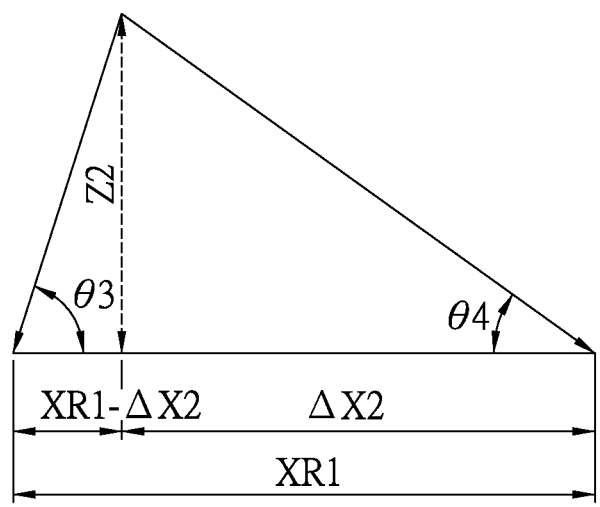
FIG. 5 shows a schematic diagram of a gesture recognition system for calculating the depth data and the horizontal displacement data according to FIG. 4.
Figure 6:
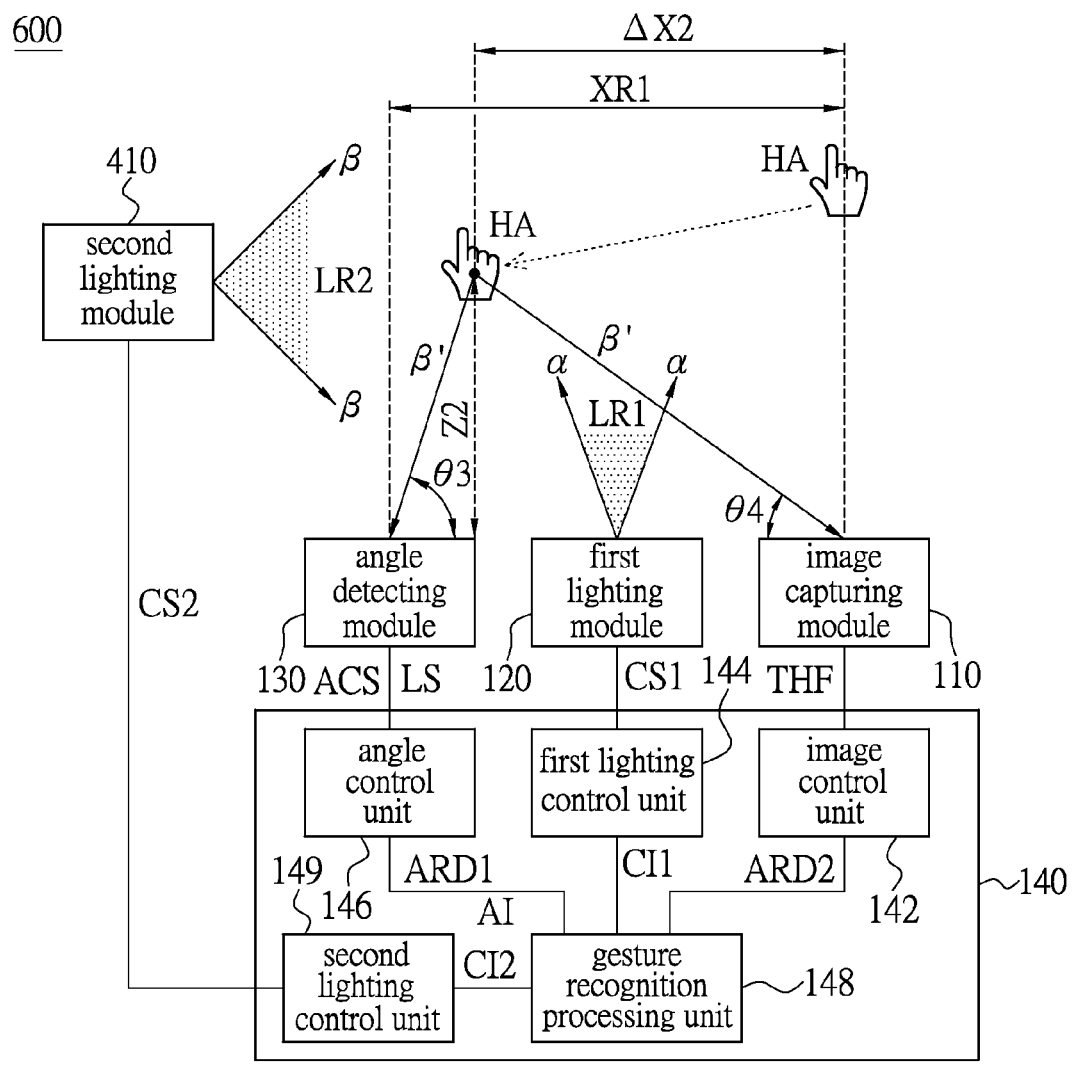
FIG. 6 shows a detailed block diagram of a gesture recognition system according to an embodiment of the instant disclosure.

One Embodiment to Expand the Light Illumination Range of the Gesture Recognition System for Recognizing Single-Hand Gestures In conjunction with FIGS. 4-6, FIG. 4 shows a block diagram of expanding the light illumination range of the gesture recognition system for recognizing single-hand gestures according to a embodiment of the instant disclosure, FIG. 5 shows a schematic diagram of a gesture recognition system for calculating the depth data and the horizontal displacement data according to FIG. 4, and FIG. 6 shows a detailed block diagram of a gesture recognition system according to an embodiment of the instant disclosure. Different from the embodiment shown in FIG. 1, in the present embodiment, the gesture recognition system 400 further comprises at least one second lighting module 410 for emitting the second light β, wherein the second light β has a second light illumination range LR2 and the illumination ranges LR1 and LR2 may be partially overlapped. It should be noticed that, the angle detecting module 130 may further receive the second reflection light β' of the second light β, and outputs the light sensing signal LS to the gesture information control module 140 according to the second reflection light β'. The second reflection light β' is generated from the reflection resulted when the second light β illuminates the single hand HA, wherein the gesture information control module 140 transmits the second lighting control signal CS2 to the second lighting module 410. It should be noticed that, the angle detecting module 130 has an optical wavelength detecting range or a light detecting period that is matching the second light β. It is worth mentioning that, the angle detecting module 130 has an optical wavelength detecting range that is matching optical wavelengths of the first light α and the second light β or a light detecting period that is matching lighting pulse periods of the first light α and the second light β. In other words, the first light α and the second light β may be same optical wavelength, or the first light α and the second light β may have the same pulse period (that is, the lighting pulse period of the first light α and the lighting pulse period of the second light β are the same). Thus, the angle detecting module 130 can receive the first reflection light α' of the first light α or the second reflection light β' of the second light β. In the gesture recognition system 400 of the present embodiment, the second lighting module 410 expands the overall light illumination range of the gesture recognition system 100 in the embodiment as shown in FIG. 1A, so as to avoid the malfunction of the overall system resulted when the displacement of the user's single hand HA is beyond the first light illumination range LR1 of the first light α.

In the present embodiment, for conveniently describing the instant disclosure, there is merely one second lighting module 410 added in the gesture recognition systems 400 and 600 so as to expand the overall light illumination range, but for the practical application of the gesture recognition system, it is not limited thereto. In another embodiment, the gesture recognition systems 400 and 600 may add a plurality of second lighting modules depending on needs. Additionally, the lighting module of the instant disclosure can not only generate the reflection light needed by the angle detecting module but also can be a light source that an image capturing module needs. In addition, different from the embodiment shown in FIG. 2, the gesture information control module 140 further comprises at least one second lighting control unit 149. As shown in FIG. 6, the second lighting control unit 149 is electrically connected to the second lighting module 410 and the gesture recognition processing unit 148. The second lighting control unit 149 outputs the second lighting control signal CS2 to the second lighting module 140 according to the second lighting instruction CI2 transmitted from the gesture recognition processing unit 148, and the second lighting module 410 emits the second light β according to the second lighting control signal CS2.

In the following description is further instruction in teaching a working principle of the gesture recognition system 600.

As shown in FIG. 6, when the user's single hand HA moves for a distance, the image capturing module 110 captures and transmits at least one two-dimensional reference image THF of the moving single hand HA to the image control unit 142 for analysis and calculation. The image control unit 142 receives at least one two-dimensional reference image THF of the single hand HA transmitted from the image capturing module 110, and the image control unit 142 calculates the second angle reference data ARD2 via the embodiment shown in FIG. 1B, such as the angle θ4 shown in FIG. 4 or FIG. 6. At this time, the displacement of the single hand HA has been beyond the first light illumination range LR1 of the first light α and the single hand HA has moved from the first light illumination range LR1 of the first light α to the second light illumination range LR2 of the second light β, so when the angle detecting module 130 detects the second reflection light β' of the second light β the angle detecting module 130 transmits the light sensing signal LS to the angle control unit 146 according to the second reflection light β'. Particularly, the second reflection light β' is generated by the reflection resulted when the second light β illuminates the single hand HA. Afterwards, the angle control unit 146 calculates the first angle reference data ARD1 of the single hand HA according to the light sensing signal LS, such as the angle θ3 shown in FIG. 4 or FIG. 6. After that, the gesture recognition processing unit 148 respectively receives the first angle reference data ARD1 and the second angle reference data ARD2 transmitted from the angle control unit 146 and the image control unit 142, and the gesture recognition processing unit 148 calculates the depth data Z2 and the horizontal displacement data ΔX2, as shown in FIG. 5, according to the fixed length XR1, the first angle reference data ARD1 and the second angle reference data ARD2 and via the simultaneous equations including the equation (3) and the equation (4). Further, the gesture recognition unit compares the gestures with the predetermined gesture operation instructions stored in a data base according to the the two-dimensional reference image THF, the depth data Z2 and the horizontal displacement data ΔX2, so as to identify the instructions of the user, such that the computer system and computer/TV games can implement the corresponding instructions or software.

$$Z2=(XR1-\Delta X2)\times\tan(\theta 3) \quad \text{equation (3)}$$

$$Z2=(\Delta X2)\times\tan(\theta 4) \quad \text{equation (4)}$$

In the following embodiments, there are only parts different from embodiments in FIG. 6 described, and the omitted parts are indicated to be identical to the embodiments in FIG. 6. In addition, for an easy instruction, similar reference numbers or symbols refer to similar elements.

[One Embodiment of the Gesture Recognition System for Recognizing Two-Hands Gestures]

Figure 7:
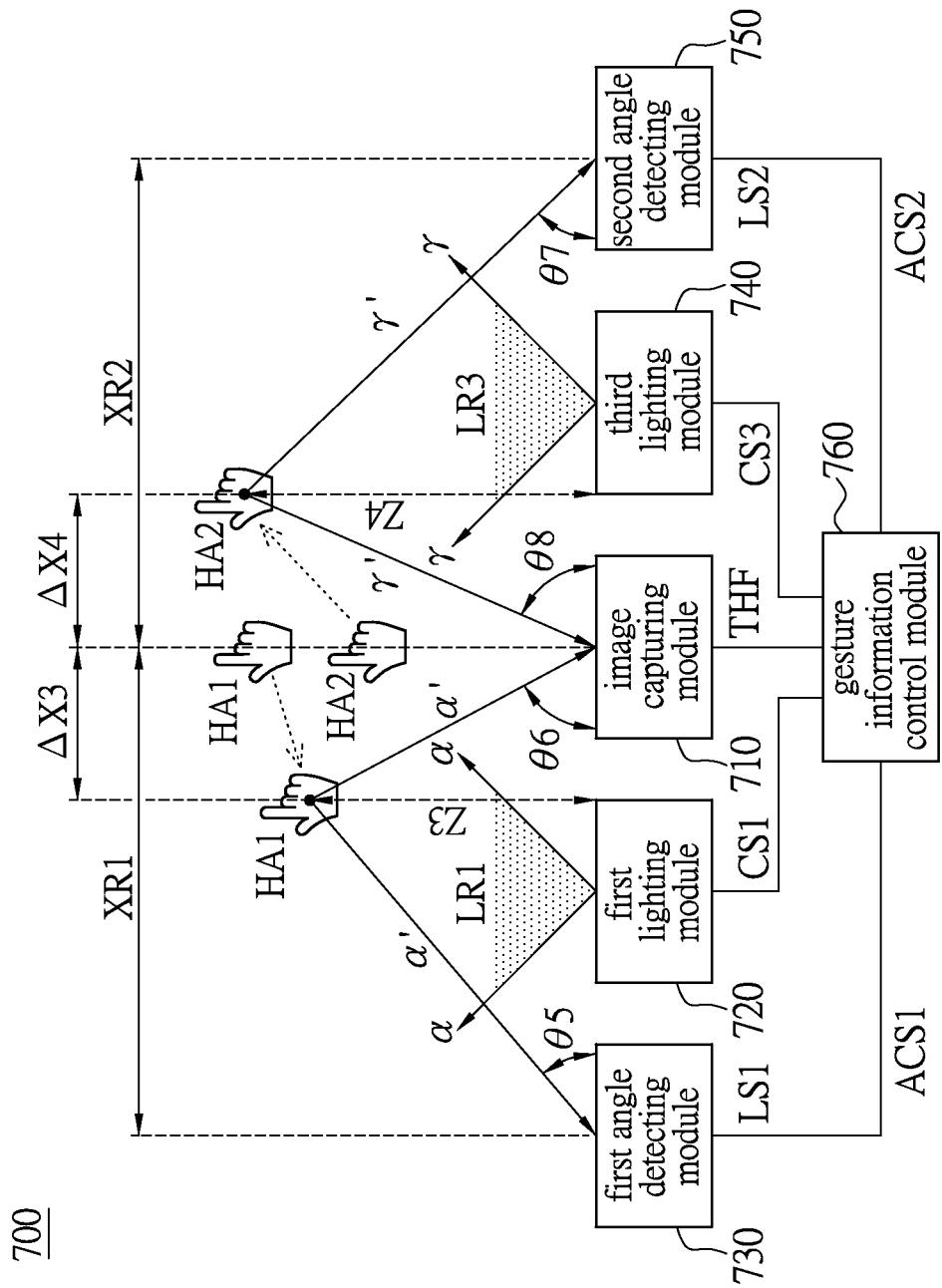
FIG. 7 shows a block diagram of a gesture recognition system for recognizing two-hands gestures according to an embodiment of the instant disclosure.

Please refer to FIG. 7, FIG. 7 shows a block diagram of a gesture recognition system for recognizing two-hands gestures according to an embodiment of the instant disclosure. The gesture recognition system 700 recognizing the user's two-hands gestures comprises an image capturing module 710, the first lighting module 720, the first angle detecting module 730, the third lighting module 740, the second angle detecting module 750 and a gesture information control module 760. The gesture information control module 760 is electrically connected to the first lighting module 720, the third lighting module 740, the first angle detecting module 730, the second angle detecting module 750 and the capturing module 710.

Regarding to the capturing module 710, the capturing module is generally configured at the upper side of the display screen (the central part), and the image capturing module 710 captures at least one two-dimensional reference image THF of the user's first hand HA1 and second hand HA2 and outputs the two-dimensional reference image THF to the gesture information control module 760.

Regarding to the first lighting module 720, the first lighting module 720 is configured at the first side of the image capturing module 710, and the first lighting module 720 emits the first light α (the first light α has the specific optical wavelength or lighting pulse period) according to the first lighting control signal CS1, wherein the first light α has the first light illumination range LR1. The first light α may be Infrared light, and the first lighting module 720 may be a Light-Emitting Diode (LED) module.

Regarding to the first angle detecting module 730, the first angle detecting module 730 is configured at the first side of the image capturing module 710, and detects the angle data of the first hand HA1 according to the first angle detecting control signal ACS1. In a further instruction, the first angle detecting module 730 receives the first reflection light α' of the first light α and outputs the first light sensing signal LS1 to the gesture information control module 760 according to the first reflection light α', wherein the first reflection light α' is generated from a reflection resulted when the first light α illuminates the user's first hand HA1. Also, the user generally makes gestures when facing the image capturing module 710, so the first hand HA1 may be defined as the user's right hand. Moreover, in the present embodiment, the distance between the first angle detecting module 730 and the image capturing module 710 is the first fixed length XR1. It is worth mentioning that, the first angle detecting module 730 has an optical wavelength detecting range that is matching optical wavelength of the first light α or a light detecting period that is matching lighting pulse period of the first light α.

Regarding to the third lighting module 740, the third lighting module 740 is configured at the second side of the image capturing module 710, and emits the third light γ (the third light γ has another specific optical wavelength or lighting pulse period) according to the third lighting control signal CS3, wherein the third light γ has the third light illumination range LR3. It is worth mentioning that, the second side of the image capturing module 710 may be another side opposite to the first side of the image capturing module 710. For example, the first side of the image capturing module 710 is defined as the left side of the image capturing module 710, and the second side of the image capturing module 710 is defined as the right side of the image capturing module 710. The third light γ may be infrared light, and the third lighting module 740 may be a Light-Emitting Diode (LED) module.

Regarding to the second angle detecting module 750, the second angle detecting module 750 is configured at the second side of the image capturing module 710, and detects the angle data of the second hand HA2 according to a second angle detecting control signal ACS2. In a further instruction, the second angle detecting module 750 receives the third reflection light γ' of the third light γ, and outputs a second light sensing signal LS2 to the gesture information control module 760 according to the third reflection light γ', wherein the third reflection light γ' is generated from the reflection resulted when the third light γ illuminates the second hand HA2. Also, the user generally makes gestures when facing the image capturing module 710, so the second hand HA2 may be defined as the user's left hand. Further, in the present embodiment, the distance between the second angle detecting module 750 and the image capturing module 710 is the second fixed length XR2. The second angle detecting module 750 has an optical wavelength detecting range that is matching optical wavelength of the third light γ or a light detecting period that is matching lighting pulse period of the third light γ.

Figure 15:
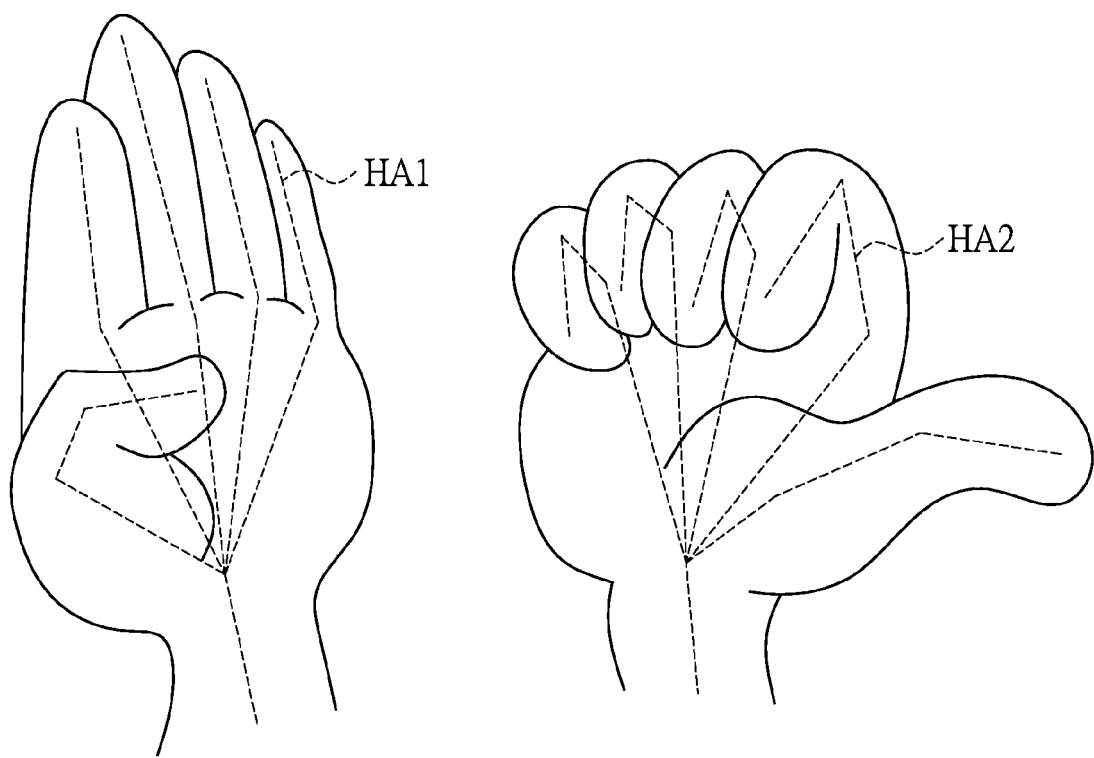
FIG. 15 shows a schematic diagram of the skeleton frame data of a first hand and a second hand according to an embodiment of the instant disclosure.

Regarding to the gesture information control module 760, the gesture information control module 760 respectively transmits the gesture information control module CS1, the third lighting control signal CS3, the first angle detecting control signal ACS1 and the second angle detecting control signal ACS2 to the first lighting module 720, the third lighting module 740, the first angle detecting module 730 and the second angle detecting module 750. The gesture information control module 760 respectively receives the two-dimensional reference image THF, the first light sensing signal LS1 and the second light sensing signal LS2 transmitted form the image capturing module 710, the first angle detecting module 730 and the second angle detecting module 750. After that, the gesture information control module 760 respectively acquires the first angle reference data (that is, the data of the angle θ5) and the second angle reference data (that is, the data of the angle θ6) according to the first light sensing signal LS1 and the two-dimensional reference image THF, and the gesture information control module acquires the third angle reference data (that is, the data of the angle θ7) and the fourth angle reference data (that is, the data of the angle θ8) respectively according to the second light sensing signal LS2 and the two-dimensional reference image THF. It should be noticed that, in the present embodiment, the gesture information control module may further acquires the first skeleton frame data of the first hand HA1 and the second skeleton frame data of the second hand HA2 from the two-dimensional reference image THF, as shown in FIG. 15, FIG. 15 shows a schematic diagram of the skeleton frame data of the first hand and the second hand according to an embodiment of the instant disclosure.

Figure 8A:
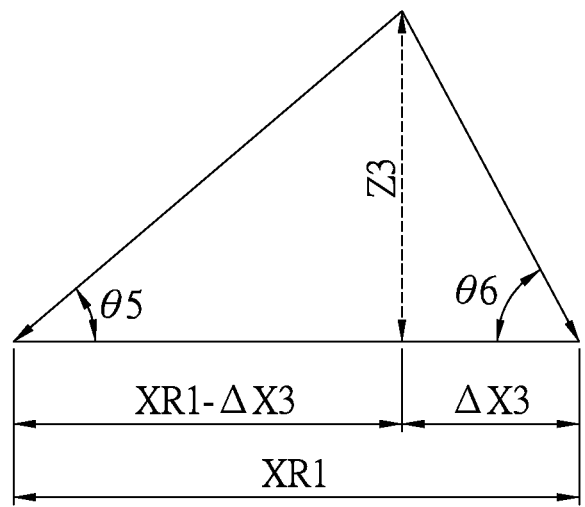
FIGS. 8A-8B shows a schematic diagram of a gesture recognition system for calculating the depth data and the horizontal displacement data according to FIG. 7.
Figure 8B:
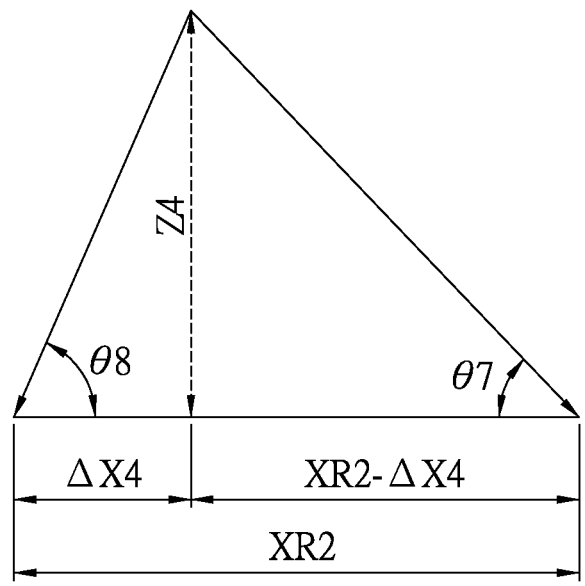

In the following description is further instruction in teaching a working principle of the gesture recognition system 700. Before having the following instruction, it should be clarified that, when using the gesture recognition system 700, the user can directly makes a predetermined gesture with two hands to the image capturing module 710. Afterwards, the computer system implements the application or function item corresponding to the gesture. To be detailed, in conjunction with FIG. 7 and FIGS. 8A-8B, FIGS. 8A-8B show a schematic diagram of a gesture recognition system for calculating the depth data and the horizontal displacement data according to FIG.7. In the gesture recognition system 700 of the present embodiment, it is assumed that the area of displacement of the user's first hand HA1 is within the first light illumination range LR1 of the first light α, and the area of displacement of the user's second hand HA2 is within the third light illumination range LR3 of the third light γ. The gesture information control module 760 respectively transmits the first lighting control signal CS1 and the third lighting control signal CS3 to the first lighting module 720 and the third lighting module 740, such that the first lighting module 720 and the third lighting module 740 respectively emits the first light α (having a first light illumination range LR1) and the third light γ (having a third light illumination range LR3). At the same time, the gesture information control module 760 respectively transmits the first angle detecting control signal ACS1 and the second angle detecting control signal ACS2 to the first angle detecting module 730 and the second angle detecting module 750, so as to respectively control the first angle detecting module 730 and the second angle detecting module 750 for receiving the first reflection light α' and the third reflection light γ'. The image capturing module 710 captures at least one two-dimensional reference image THF of the first hand HA1 and the second hand HA2, and transmits at least one two-dimensional reference image THF to the gesture information control module 760 for analysis and calculation.

Besides, the first angle detecting module 730 receives the first reflection light α' generated from the reflection resulted when the first light α illuminates the first hand HA1, and transmits the corresponding first light sensing signal LS1 to the gesture information control module 760, wherein the first angle detecting module 730 may be designed as a function module that can only receive the first light α so as to avoid circuit malfunction because of receiving other light. The second angle detecting module 750 receives the third reflection light γ' generated from the reflection resulted when the third light γ illuminates the second hand HA2, and transmits the corresponding second light sensing signal LS2 to the gesture information control module 760, wherein the second angle detecting module 750 may be designed as a function module that can only receive the third light γ so as to avoid circuit malfunction because of receiving other light. It is worth mentioning that, the optical wavelength of the first light α may be different from the optical wavelength of the third light γ, or the first light α and the third light γ may have different lighting pulse periods. Moreover, in the instant disclosure, the first angle detecting module 730 has an optical wavelength detecting range that is matching optical wavelength of the first light α, or a light detecting period that is matching lighting pulse period of the first light α. Also, the second angle detecting module 750 has an optical wavelength detecting range thst is matching optical wavelength of the third light γ, or a light detecting period that is matching lighting pulse period of the third light γ. Therefore, the gesture recognition system 700 can avoid the misjudgment generated by the first angle detecting module 730 and the second angle detecting module 750. In one embodiment, the first lighting module 720 and the third lighting module 740 avoid the misjudgment generated by the first angle detecting module 730 and the second angle detecting module 750 via time-division multiplexing.

When the gesture information control module 760 receives at least one two-dimensional reference image THF of the first hand HA1 and the second hand HA2 transmitted from the image capturing module 710, the gesture information control module calculates the second angle reference data of the first hand HA1 (the data of the angle θ6) and the fourth angle reference data of the second hand HA2 (the data of the angle θ8) from the two-dimensional reference image THF according to the embodiment shown in FIG. 1B. Additionally, when the gesture information control module 760 respectively receives the first light sensing signal LS1 and the second light sensing signal LS2 transmitted from the first angle detecting module 730 and the second angle detecting module 750, the gesture information control module 760 calculates the first angle reference data of the first hand HA1 (the data of the angle θ5) and the third angle reference data of the second hand HA2 (the data of the angle θ7) respectively according to the first light sensing signal LS1 and the second light sensing signal LS2. After that, as shown in FIGS. 8A-8B, the gesture information control module 760 calculates the first depth data Z3 and the first horizontal displacement data ΔX3 (that is, the horizontal displacement of the first hand HA1) according to the first fixed length XR1, the first angle reference data and the second angle reference data and via the simultaneous equations including the equation (5) and the equation (6). Moreover, the gesture information control module 760 calculates the depth data Z4 and the second horizontal displacement data ΔX4 (that is, the horizontal displacement of the second HA2) according to the second fixed length XR2, the third angle reference data and the fourth angle reference data and via the simultaneous equations including the equation (7) and the equation (8). Afterwards, the gesture information control module 760 compares the user's two-hands gestures with the predetermined two-hands gesture operation instructions stored in a database according to the two-dimensional reference image THF, the depth data (such as the depth data Z3 and Z4) and the horizontal displacement data (such as ΔX3 and ΔX4) of the first hand HA1 and the second HA2 so as to identify the instructions of the user, such that the computer system and computer/TV game can execute the corresponding instructions or software.

To be brief, the gesture recognition system 700 for recognizing two-hands gestures provided by the instant disclosure acquires two angle data of the first hand HA1 and two angle data of the second hand HA2 by the first angle detecting module 730, the second angle detecting module 750 and the image capturing module 710, and transforms the angle data of the first hand HA1 and the second hand HA2 into the depth data by the gesture information control module 760.

$$Z3=(XR1-\Delta X3)\times\tan(\theta 5) \quad \text{equation (5)}$$

$$Z3=(\Delta X3)\times\tan(\theta 6) \quad \text{equation (6)}$$

$$Z4=(XR2-\Delta X4)\times\tan(\theta 7) \quad \text{equation (7)}$$

$$Z4=(\Delta X4)\times\tan(\theta 8) \quad \text{equation (8)}$$

For a specific instruction on an operation process of the gesture recognition system 700 of the instant disclosure, there is at least one of the embodiments for further instruction.

In the following embodiments, there are only parts different from embodiments in FIG. 7 described, and the omitted parts are indicated to be identical to the embodiments in FIG. 7. In addition, for an easy instruction, similar reference numbers or symbols refer to similar elements.

[Another Embodiment of the Gesture Recognition System for Recognizing Two-Hands Gestures]

Figure 9:
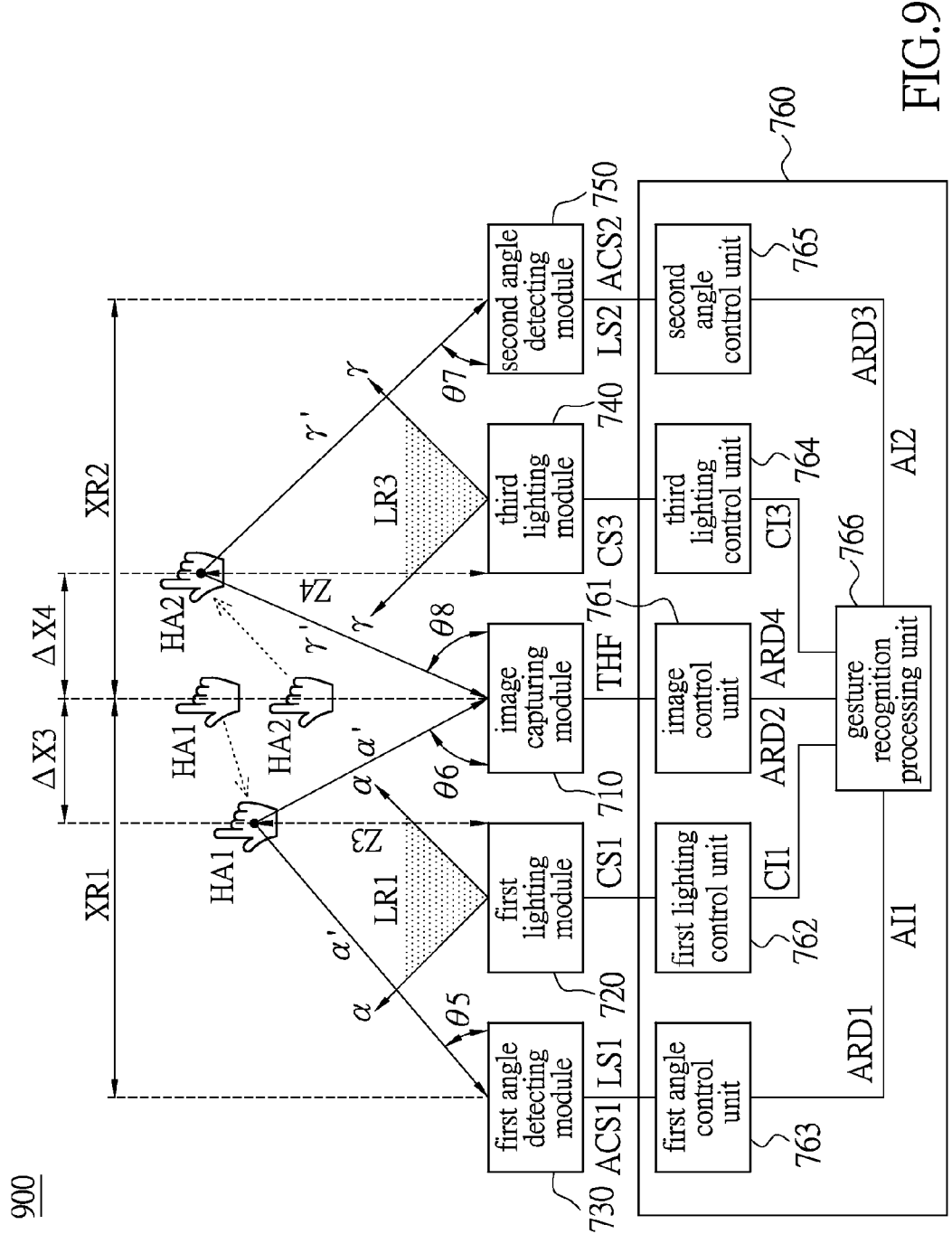
FIG. 9 shows a detailed block diagram of a gesture recognition system according to another embodiment of the instant disclosure.

Please refer to FIG. 9, FIG. 9 shows a detailed block diagram of a gesture recognition system according to another embodiment of the instant disclosure. Different from the embodiment shown in FIG. 7, in the present embodiment, the gesture information control module 760 of the gesture recognition system 900 comprises an image control unit 761, a first lighting control unit 762, a first angle control unit 763, a third lighting control unit 764, a second angle control unit 765 and a gesture recognition processing unit 766. The image control unit 761 is electrically connected to the image capturing module 710, the first lighting control unit 762 is electrically connected to the first lighting module 720, the first angle control unit 763 is electrically connected to the first angle detecting module 730, the third lighting control unit 764 is electrically connected to the third lighting module 740, the second angle control unit 765 is electrically connected to the second angle detecting module 750 and the gesture recognition processing unit 766 is electrically connected to the image control unit 761, the first lighting control unit 762, the first angle control unit 763, the third lighting control unit 764 and the second angle control unit 765.

Regarding to the image control unit 761, the image control unit 761 receives the two-dimensional reference image THF, and calculates the second angle reference data ARD2 and the fourth angle reference data ARD4 according to the two-dimensional reference image THF from the image capturing module 710 while utilizing the method of acquiring angle data of the embodiment shown in FIG. 1B, thus the redundant information is not repeated.

Regarding to the first lighting control unit 762, the first lighting control unit 762 outputs the first lighting control signal CS1 according to the first lighting instruction CI1 transmitted from the gesture recognition processing unit 766, so as to control the first lighting module 720 to emit the first light α.

Regarding to the first angle control unit 763, the first angle control unit 763 receives the first light sensing signal LS1, and calculates the first angle reference data ARD1 according to the first light sensing signal LS1, wherein the first angle control unit 763 transmits the first angle detecting control signal ACS1 to the first angle detecting module 730 according to the first angle detecting instruction AI1.

Regarding to the third lighting control unit 764, the third lighting control unit 764 outputs the third lighting control signal CS3 according to the third lighting instruction CI3 transmitted from the gesture recognition processing unit 766, so as to control the third lighting module 740 to emit the third light γ.

Regarding to the second angle control unit 765, the second angle control unit 765 receives the second light sensing signal LS2, and calculates the third angle reference data ARD3 according to the second light sensing signal LS2, wherein the second angle control unit 765 transmits the second angle detecting control signal ACS2 to the second angle detecting module 750 according to the second angle detecting instruction AI2.

Regarding to the gesture recognition processing unit 766, the gesture recognition processing unit 766 receives the first angle reference data ARD1, the second angle reference data ARD2, the third angle reference data ARD3 and the fourth angle reference data ARD4. Afterwards, the gesture recognition processing unit 766 calculates the first depth data Z3 and the first horizontal displacement data ΔX3 of the first hand HA1 according to the first angle reference data ARD1, the second angle reference data ARD2 and the first fixed length XR1. Further, the gesture recognition processing unit 766 calculates the second depth data Z4 and the second horizontal displacement data ΔX4 of the second hand HA2 according to the third angle reference data ARD3, the fourth angle reference data ARD4 and the second fixed length XR2, so as to recognize gestures of the first hand HA1 and the second hand HA2. Additionally, the gesture recognition processing unit 766 acquires the first skeleton frame data of the first hand HA1 and the second skeleton frame data of the second hand HA2 from the two-dimensional reference image THF.

In the following description is further instruction in teaching a working principle of the gesture recognition system 900.

In the present embodiment, the gesture recognition processing unit 766 respectively transmits the first lighting instruction CI1 and the third lighting instruction CI3 to the first lighting control unit 762 and the third lighting control unit 764, such that the first lighting control unit 762 transmits the first lighting control signal CS1 to the first lighting module 720 so as to emit the first light α (having a first light illumination range LR1) to the user's first hand HA1, and the third lighting control unit 764 transmits the third lighting control signal CS3 to the third lighting module 740 so as to emit the third light γ (having a third light illumination range LR3) to the user's second hand HA2. Moreover, the gesture recognition processing unit 766 respectively transmits the first angle detecting instruction AI1 and the second angle detecting instruction AI2 to the first angle control unit 763 and the second angle control unit 765, such that the first angle control unit 763 outputs the first angle detecting control signal ACS1 to control the first angle detecting module 730 to receive the first reflection light α' generated from the reflection resulted when the first light α illuminates the user's first hand HA1, and the second angle control unit 765 outputs the second angle detecting control signal ACS2 to control the second angle detecting module 750 to detect or receive the third reflection light γ' generated from the reflection resulted when the third light γ illuminates to the user's second hand HA2. Also, the image capturing module 710 captures at least one two-dimensional reference image THF (sequence two-dimensional image) of the user's first hand HA1 and second hand HA2, and transmits at least one two-dimensional reference image THF of the first hand HA1 and the second hand HA2 to the image control unit 761 for analysis and calculation. When the image control unit 761 receives at least one two-dimensional reference image THF of the first hand HA1 and the second hand HA2 transmitted from the image capturing module 710, the image control unit 761 calculates the second angle reference data ARD2 (the data of the angle θ6) and the fourth angle reference data ARD4 (the data of the angle θ8) of the two-dimensional reference image THF via the embodiment shown in FIG. 1B. After that, the image control unit 761 transmits the second angle reference data ARD2 and the fourth angle reference data ARD4 to the gesture recognition processing unit 766. Besides, after the first angle detecting module 730 receives the first reflection light α' generated from the reflection resulted when the first light α illuminates the first hand HA1, the first angle detecting module 730 transmits the first light sensing signal LS1 corresponding to the first reflection light α' to the first angle control unit 763. On the other hand, after the second angle detecting module 750 receives the third reflection light γ' generated from the reflection resulted when the third light γ illuminates the second hand HA2, the second angle detecting module 750 transmits the second light sensing signal LS2 corresponding to the third reflection light γ' to the second angle control unit 765. It is worth mentioning that the first angle detecting module 730 can be designed as a function module that can only receive the first light α, and the second angle detecting module 750 can be designed as a function module that can only receive the third light γ, so as to avoid circuit malfunction because of receiving other lights. After that, the first angle control unit 763 makes analysis and calculation according to the received first light sensing signal LS1 so as to acquire the first angle reference data ARD1 (the data of the angle θ5), and the first angle control unit 763 transmits the first angle reference data ARD1 to the gesture recognition processing unit 766. On the other hand, the second angle control unit 765 makes analysis and calculation according to the received second light sensing signal LS2 so as to acquire the third angle reference data ARD3 (the data of the angle θ7), and the second angle control unit 765 transmits the third angle reference data ARD3 to the gesture recognition processing unit 766.

Afterwards, in conjunction with FIGS. 8A-8B and FIG. 9, the gesture recognition processing unit 766 calculates the first depth data Z3 and the first horizontal displacement data ΔX3 of the first hand HA1 according to the first fixed length XR1, the first angle reference data ARD1 and the second angle reference data ARD2 and via the simultaneous equations including the equation (5) and the equation (6). Besides, the gesture recognition processing unit 766 calculates the second depth data Z4 and the second horizontal displacement data ΔX4 of the second hand HA2 according to the second fixed length XR2, the third angle reference data ARD3 and the fourth angle reference data ARD4 and via the simultaneous equations including the equation (7) and the equation (8). After that, the gesture recognition processing unit 766 compares the user's two-hands gestures with the predetermined gesture operation instructions for two hands so as to identify the instructions of the user, such that the computer system and computer/TV games implement the corresponding instructions and software.

For a specific instruction on an operation process of the gesture recognition system 900 of the instant disclosure, there is at least one of the embodiments for further instruction.

In the following embodiments, there are only parts different from embodiments in FIG. 9 described, and the omitted parts are indicated to be identical to the embodiments in FIG. 9. In addition, for an easy instruction, similar reference numbers or symbols refer to similar elements.

[One Embodiment to Expand the Light Illumination Range of the Gesture Recognition System for Recognizing Two-Hands Gestures]

Figure 10:
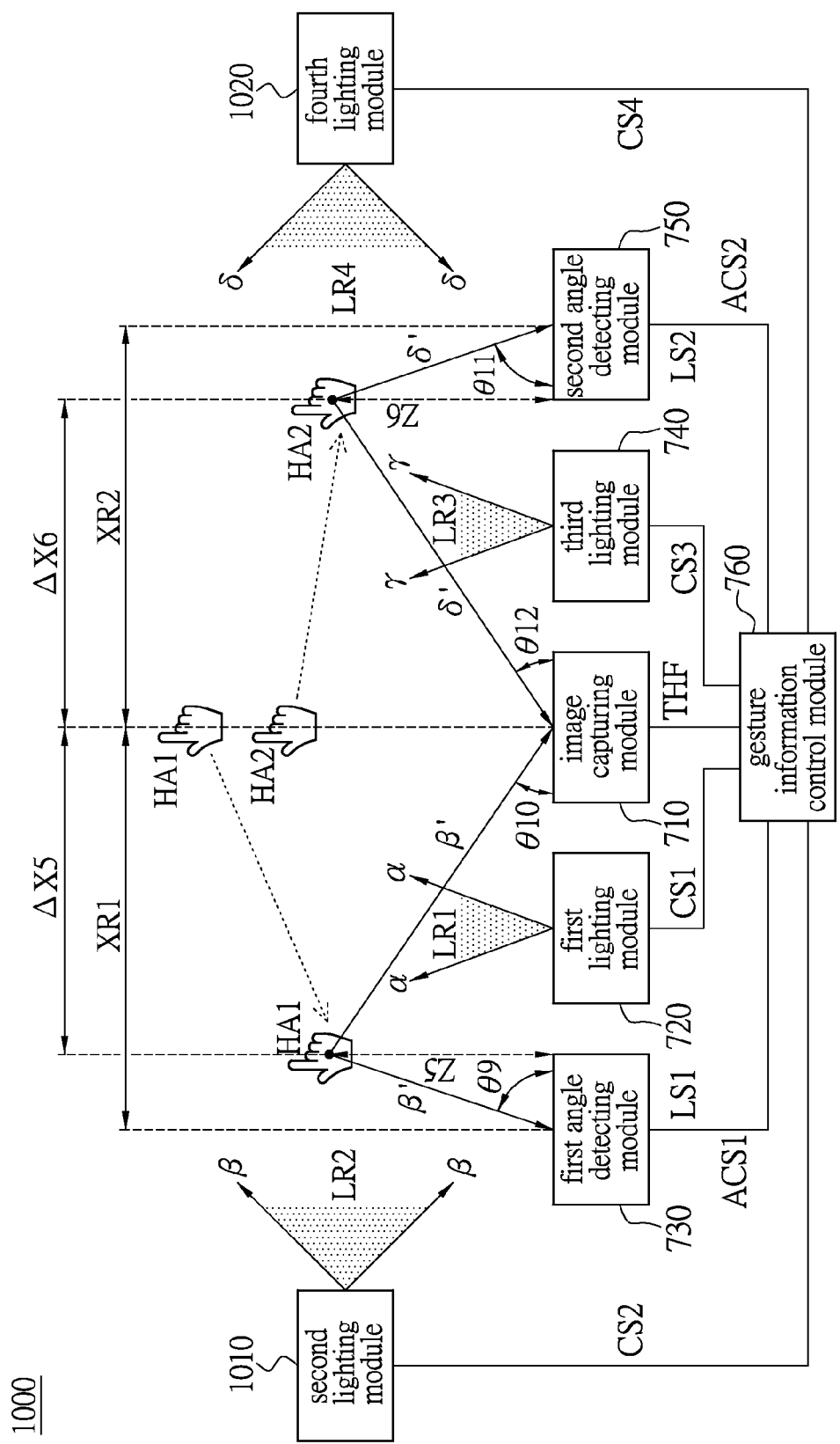
FIG. 10 shows a block diagram of expanding the light illumination range of the gesture recognition system for recognizing two-hands gestures according to a embodiment of the instant disclosure.
Figure 11:
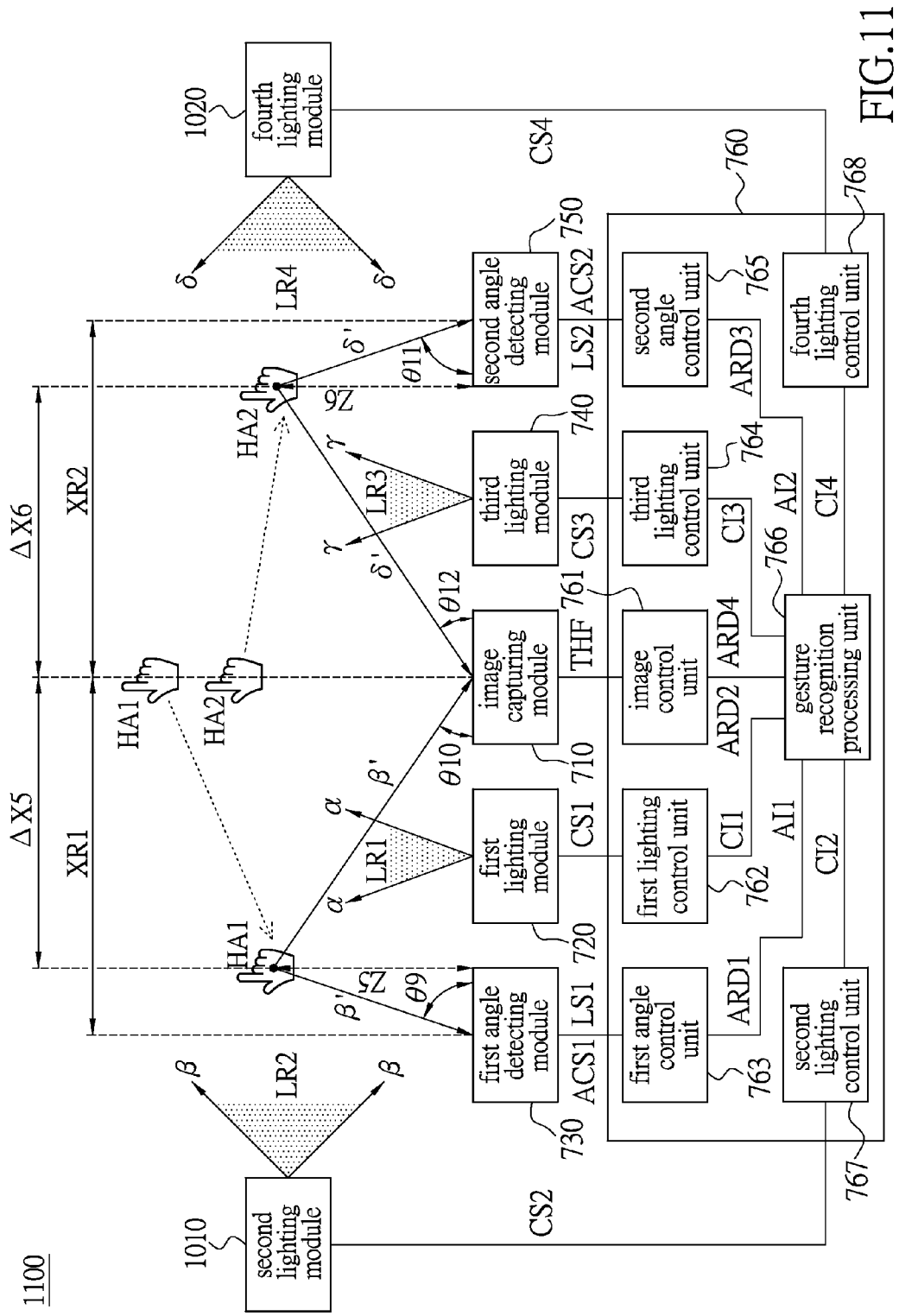
FIG. 11 shows a detailed block diagram of expanding the light illumination range of the gesture recognition system for recognizing two-hands gestures according to a embodiment of the instant disclosure.

In conjunction with the FIG. 10 and FIG. 11, FIG. 10 shows a block diagram of expanding the light illumination range of the gesture recognition system for recognizing two-hands gestures according to a embodiment of the instant disclosure, and FIG. 11 shows a detailed block diagram of expanding the light illumination range of the gesture recognition system for recognizing two-hands gestures according to a embodiment of the instant disclosure. Different from the embodiment shown in FIG. 7, in the present embodiment, the gesture recognition system 1000 further comprises at least one second lighting module 1010 for emitting the second light β and at least one fourth lighting module 1020 for emitting the fourth light δ. The second lighting module emits the second light according to the second lighting control signal, and the fourth lighting module emits the fourth light according to the fourth lighting control signal. Also, the second light β has a second light illumination range LR2 and the light illumination ranges LR1 and LR2 can be partially overlapped, and the fourth light d has the fourth light illumination range LR4 and the light illumination ranges LR3 and LR4 can be partially overlapped. It should be noticed that, the first angle detecting module 730 further receives the second reflection light β' of the second light β and outputs the first light sensing signal LS1 to the first angle control unit 763 according to the second reflection light β', and the second angle detecting module 750 further receives the fourth reflection light δ' of the fourth light δ and outputs the second light sensing signal LS2 to the second angle control unit 765 according to the fourth reflection light δ'. The second reflection light β' is generated from the reflection resulted when the second light β illuminates the first hand HA1 and the fourth reflection light δ' is generated from the reflection resulted when the fourth light δ illuminates the second hand HA2, wherein the gesture information control module transmits the second lighting control signal and the fourth lighting control signal to the second lighting module and the fourth lighting module.

Before having the following instruction, it should be clarified that, the first light α and the second light β can be the same optical wavelength, or the first light α and the second light β can have the same lighting pulse period, and thus the first angle detecting module 730 can receive the first light α (or the first reflection light α' thereof) or the second light β (or the second reflection light β' thereof). Moreover, the third light γ and the fourth light δ can be the same optical wavelength, or the third light γ and the fourth light δ can have the same lighting pulse period, and thus the second angle detecting module 750 can receive the third light γ (or the third reflection light γ' thereof) or the fourth light δ (or the fourth reflection light δ' thereof). It should be noticed that, in order to avoid the misjudgment of the gesture information control module 760 resulted from the erroneous receiving by the first angle detecting module 730 and the second angle detecting module 750, optical wavelength of the first light α may be different from the optical wavelength of the third light γ, or the first light α and the third light γ have different lighting pulse periods. Besides, it should be noticed that, in the present embodiment, the first angle detecting module 730 has an optical wavelength detecting range that is matching optical wavelength of the first light α and optical wavelength of the second light β, or the first angle detecting module 730 has a light detecting period that is matching lighting pulse period of the first light α and lighting pulse period of the second light β. Also, the second angle detecting module 750 has an optical wavelength detecting range that is matching optical wavelength of the third light γ and optical wavelength of the fourth light δ, or the second angle detecting module 750 has a light detecting period that is matching lighting pulse period of the third light γ and lighting pulse period of the fourth light δ. Thereby, the misjudgment in the gesture recognition systems 1000 or 1100 can be avoided.

In one embodiment, the lighting modules 720, 1010, 740 and 1020 can avoid erroneous receiving of lights resulted from the first angle detecting module 730 and the second angle detecting module via time-division multiplexing. In the gesture recognition system 1000 of the present embodiment, the second lighting module 1010 expands the overall light illumination range of the gesture recognition system 700 shown in FIG. 7, so as to avoid malfunction of the system resulted when the user's first hand HA1 moves beyond the first light illumination range LR1 of the first light α. Likewise, the the fourth lighting module 1020 expands the overall light illumination range of the gesture recognition system 700 shown in FIG. 7, so as to avoid malfunction of the system resulted when the user's second hand HA2 moves beyond the third light illumination range LR3 of the third light γ.

In one embodiment, the first lighting module 720 and the third lighting module 740 are configured at the upper side of the display screen of an electric device such as a laptop, pad or mobile phone, and the second lighting module 1010 and the fourth lighting module 1020 are respectively configured at the left side and right side of the display screen of the electric device (such as the laptop, the pad or mobile phone), which thereby expands the overall light illumination range of the gesture recognition system 1100.

In the present embodiment, for conveniently describing the instant disclosure, there is merely two symmetric lighting modules (1010 and 1020) added in the gesture recognition systems 1000 and 1100 recognizing two-hands gestures, but in the practical applications of the gesture recognition system, it is not limited thereto. In another embodiment, there could be a plurality of the second lighting modules and a plurality of the fourth lighting modules added in the gesture recognition systems 1010 and 1100 depending on needs, wherein the second lighting modules are respectively electrically connected to the gesture information control module 760 and the second lighting modules emit lights to expand an overall light illumination range of the gesture recognition system. Additionally, the fourth lighting modules are respectively electrically connected to the gesture information control module 760, and the fourth lighting modules emit light to expand an overall light illumination range of the gesture recognition system. Further, different from the embodiment shown in FIG. 9, the gesture information control module 760 comprises at least one second lighting control unit 767 and at least one fourth lighting control unit 768. As shown in FIG. 11, the second lighting control unit 767 is electrically connected to the second lighting module 1010 and the gesture recognition processing unit 766. The second lighting control unit 767 outputs the second lighting control signal CS2 to the second lighting module 1010 according to the second lighting instruction CI2 transmitted from the gesture recognition processing unit 766, and the the second lighting module 1010 emits the second light β according to the second lighting control signal CS2. The fourth lighting control unit 768 is electrically connected to the fourth lighting module 1020 and the gesture recognition processing unit 766. The fourth lighting control unit 768 outputs the fourth lighting control signal CS4 to the fourth lighting module 1020 according to the fourth lighting instruction CI2 transmitted from the gesture recognition processing unit 766, and the the fourth lighting module 1020 emits the fourth light δ according to the fourth lighting control signal CS4.

In the following description is further instruction in teaching a working principle of the gesture recognition system 1100.

As shown in FIG. 11, when the user's first hand HA1 and the second hand HA2 moves for a distance, the image capturing module 710 captures and transmits at least one two-dimensional reference image THF of the moving the first hand HA1 and the second hand HA2 to the image control unit 761 for analysis and calculation. The image control unit 761 receives at least one two-dimensional reference image THF of the first hand HA1 and the second hand HA2 transmitted from the image capturing module 110, and the image control unit 761 calculates the second angle reference data ARD2 and the fourth angle reference data ARD4, resoectively as the angles θ10 and θ12 shown in FIG. 10 or FIG. 11, from the two-dimensional reference image THF via the embodiment shown in FIG. 1B. At this time, the position of the first hand HA1 has been beyond the first light illumination range LR1 of the first light α and the first hand HA1 has moved from the first light illumination range LR1 of the first light to the second light illumination range LR2 of the second light β, so when the first angle detecting module 730 detects the second reflection light β' of the second light β, the first angle detecting module 730 transmits the first light sensing signal LS1 to the first angle control unit 146 according to the second reflection light β', wherein the second reflection light β' is generated from the reflection resulted when the second light β illuminate the first hand HA1. On the other hand, the position of the second hand HA2 has been beyond the third light illumination range LR3 of the third light γ and the second hand HA2 has moved from the third light illumination range LR3 of the third light γ to the fourth light illumination range LR4 of the fourth light δ, so when the second angle detecting module 750 detects the fourth reflection light δ' of the fourth light δ, the second angle detecting module 750 transmits the second light sensing signal LS2 to the second angle control unit 765 according to the fourth reflection light δ', wherein the fourth reflection light δ' is generated from the reflection resulted when the fourth light δ illuminates the second hand HA2.

Afterwards, the first angle control unit 763 calculates the first angle reference data ARD1 of the first hand HA1 according to the first light sensing signal LS1, such as the angle θ9 shown in FIG. 10 or FIG. 11. On the other hand, the second angle control unit 765 calculates the third angle reference data ARD3 of the second hand HA2 according to the second light sensing signal LS2, such as the angle θ11 shown in FIG. 10 or FIG. 11. Further, the gesture recognition processing unit 766 respectively receives the first angle reference data ARD1 and the second angle reference data ARD2 (two angle data of the first hand HA1) transmitted from the first angle control unit 763 and the image control unit 761, and the gesture recognition processing unit 766 calculates the first depth data Z5 and the first horizontal displacement data ΔX5 of the user's first hand HA1 according to the first fixed length XR1, the first angle reference data ARD1 and the second angle reference data ARD2 and via the simultaneous equations including the equation (9) and the equation (10). On the other hand, the gesture recognition processing unit 766 respectively receives the third angle reference data ARD3 and the fourth angle reference data ARD4 (two angle data of the second hand HA2) transmitted from the second angle control unit 765 and the image control unit 761, and the gesture recognition processing unit 766 calculates the second depth data Z6 and the second horizontal displacement data ΔX6 of the user's second hand HA2 according to the second fixed length XR2, the third angle reference data ARD3 and the fourth angle reference data ARD4 and via the simultaneous equations including the equation (11) and the equation (12). After that, the gesture recognition processing unit 766 compares the user's two-hands gestures with the predetermined two-hands gesture operation instructions stored in a database according to the two-dimensional reference image THF, the first depth data Z5, and the second depth data Z6, the first displacement data ΔX5 and the second displacement data ΔX6 so as to identify the instructions of the user, such the the computer system and computer/TV games can implement the corresponding instructions and software.

$$Z5=(XR1-\Delta X5)\times\tan(\theta 9) \quad \text{equation (9)}$$

$$Z5=(\Delta X5)\times\tan(\theta 10) \quad \text{equation (10)}$$

$$Z6=(XR2-\Delta X6)\times\tan(\theta 11) \quad \text{equation (11)}$$

$$Z6=(\Delta X6)\times\tan(\theta 12) \quad \text{equation (12)}$$

[One Embodiment of the Gesture Recognition Method for Recognizing Single-Hand Gestures]

Figure 12:
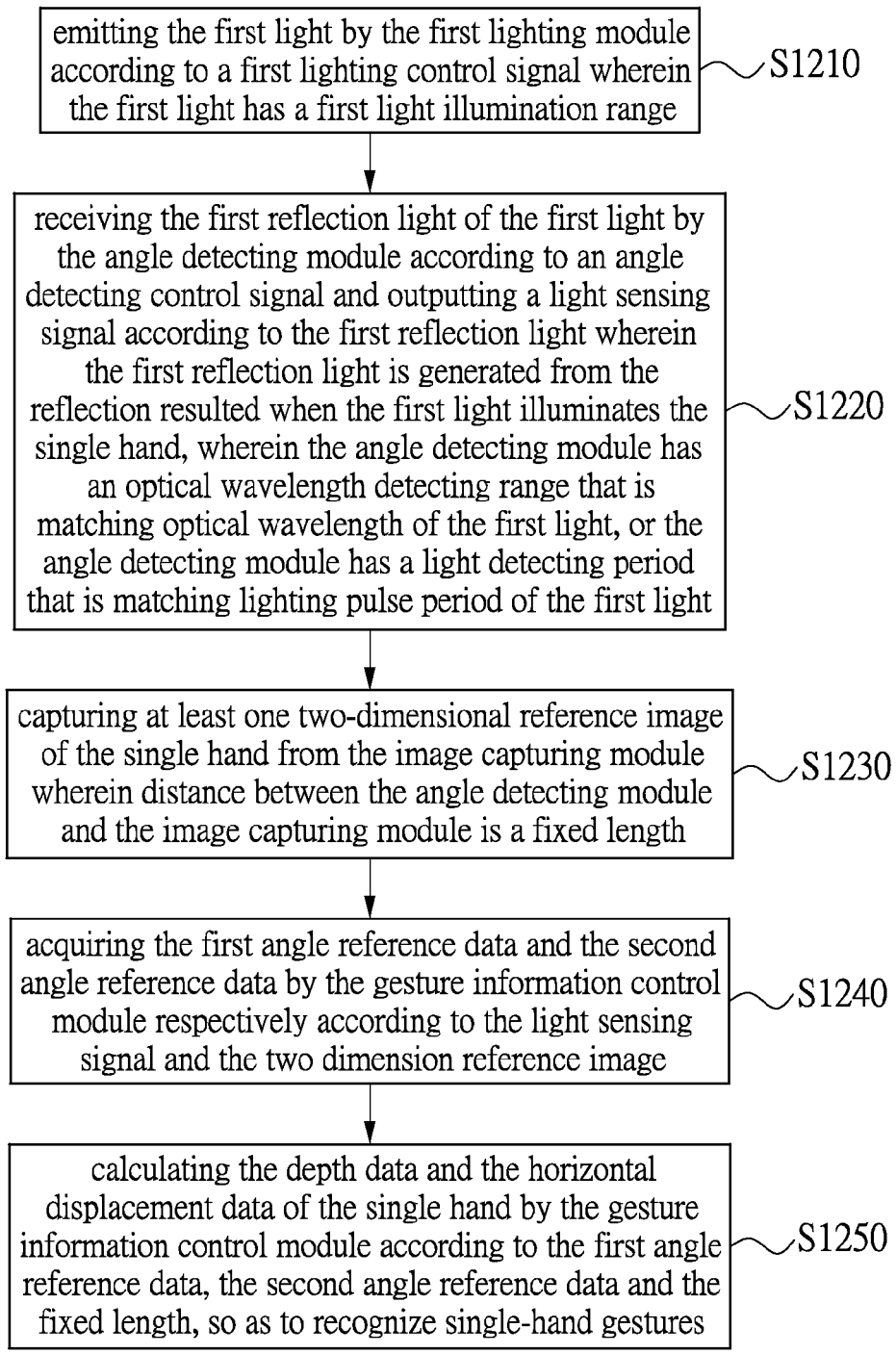
FIG. 12 shows a flow chart of a gesture recognition method for recognizing single-hand gestures according to an embodiment of the instant disclosure.

Please refer to FIG. 12, FIG. 12 shows a flow chart of a gesture recognition method for recognizing single-hand gestures according to an embodiment of the instant disclosure. The method of the present embodiment may be conducted in the gesture recognition systems 100, 300, 400 and 600 shown in FIGS. 1, 3-4 and 6 and thus please refer to FIGS. 1, 3-4 and 6 for further understanding. The gesture recognition method include steps as follows: emitting the first light by the first lighting module according to a first lighting control signal wherein the first light has a first light illumination range (Step S1210); receiving the first reflection light of the first light by the angle detecting module according to an angle detecting control signal and outputting a light sensing signal according to the first reflection light wherein the first reflection light is generated from the reflection resulted when the first light illuminates the single hand, wherein the angle detecting module has an optical wavelength detecting range that is matching optical wavelength of the first light, or the angle detecting module has a light detecting period that is matching lighting pulse period of the first light (Step S1220); capturing at least one two-dimensional reference image of the single hand from the image capturing module and outputting the two-dimensional reference image, wherein the distance between the angle detecting module and the image capturing module is a fixed length (Step S1230); acquiring the first angle reference data and the second angle reference data by the gesture information control module respectively according to the light sensing signal and the two-dimensional reference image (Step S1240); and calculating the depth data and the horizontal displacement data of the single hand by the gesture information control module according to the first angle reference data, the second angle reference data and the fixed length, so as to recognize single-hand gestures (Step S1250).

Relevant details of the steps of the gesture recognition method regarding the gesture recognition system are described in the embodiments of FIGS. 1, 3-4 and 6, and thus it is not repeated thereto. It is clarified that, a sequence of steps in FIG. 12 is set for a need to instruct easily, and thus the sequence of the steps is not used as a condition in demonstrating the embodiments of the instant disclosure.

[One Embodiment of the Gesture Recognition Method for Recognizing Two-Hands Gestures]

Figure 13:
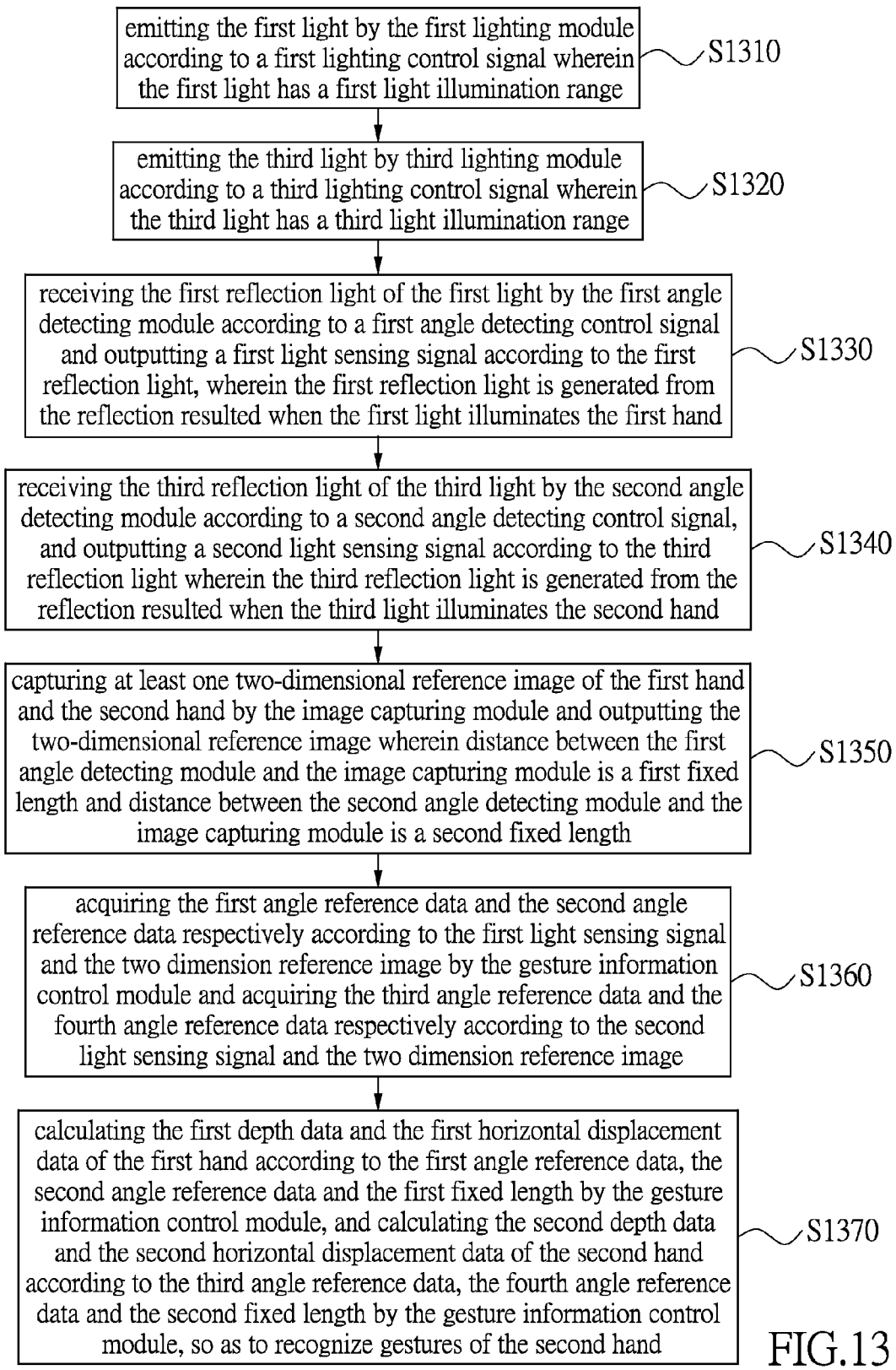
FIG. 13 shows a flow chart of a gesture recognition method for recognizing two-hands gestures according to an embodiment of the instant disclosure.

Please refer to FIG. 13, FIG. 13 shows a flow chart of a gesture recognition method for recognizing two-hands gestures according to an embodiment of the instant disclosure. The method of the present embodiment may be conducted in the gesture recognition systems 700, 900, 1000 and 1100 shown in FIGS. 7 and 9-11 and thus please refer to FIGS. 7 and 9-11 for further understanding. The gesture recognition method include steps as follows: emitting the first light by the first lighting module according to a first lighting control signal wherein the first light has a first light illumination range (Step S1310); emitting the third light by third lighting module according to a third lighting control signal wherein the third light has a third light illumination range (Step S1320); receiving the first reflection light of the first light by the first angle detecting module according to a first angle detecting control signal and outputting a first light sensing signal according to the first reflection light wherein the first reflection light is generated from the reflection resulted when the first light illuminates a first hand, wherein the first angle detecting module has an optical wavelength detecting range that is matching optical wavelength of the first light, or the first angle detecting module has a light detecting period that is matching lighting pulse period of the first light (Step S1330); receiving the third reflection light of the third light by the second angle detecting module according to a second angle detecting control signal, and outputting a second light sensing signal according to the third reflection light wherein the third reflection light is generated from the reflection resulted when the third light illuminates the second hand, wherein the second angle detecting module has an optical wavelength detecting range that is matching optical wavelength of the third light, or the second angle detecting module has a light detecting period that is matching lighting pulse period of the third light (Step S1340); capturing at least one two-dimensional reference image of the first hand and the second hand by the image capturing module and outputting the two-dimensional reference image wherein the distance between the first angle detecting module and the image capturing module is a first fixed length and the distance between the second angle detecting module and the image capturing module is a second fixed length (Step S1350); acquiring the first angle reference data and the second angle reference data respectively according to the first light sensing signal and the two-dimensional reference image by the gesture information control module and acquiring the third angle reference data and the fourth angle reference data respectively according to the second light sensing signal and the two-dimensional reference image (Step S1360); and calculating the first depth data and the first horizontal displacement data of the first hand according to the first angle reference data, the second angle reference data and the first fixed length by the gesture information control module, and calculating the second depth data and the second horizontal displacement data of the second hand according to the third angle reference data, the fourth angle reference data and the second fixed length by the gesture information control module, so as to recognize gestures of the second hand (Step S1370).

Relevant details of the steps of the gesture recognition method regarding the gesture recognition system are described in the embodiments of FIGS. 7 and 9-11, and thus it is not repeated thereto. It is clarified that, a sequence of steps in FIG. 13 is set for a need to instruct easily, and thus the sequence of the steps is not used as a condition in demonstrating the embodiments of the instant disclosure.

To sum up, by a gesture information control module, the gesture recognition system and the gesture recognition method provided by the instant disclosure can transfer the angle reference data of hands into the depth data of hands by an image processing module that can merely capture two-dimensional reference images. Further, the gesture information control module can acquire the first angle reference data and the second angle reference data respectively according to the light sensing signal and the two-dimensional reference image, so as to calculate the depth data of hands. Therefore, comparing with the prior art, the gesture recognition system provided by the instant disclosure can dramatically reduce the load of system calculation and the cost for designing and manufacturing.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A gesture recognition system, recognizing single-hand gestures, comprising:
   a first lighting module for emitting a first light according to a first lighting control signal wherein the first light has a first light illumination range;
   an angle detecting module receiving a first reflection light of the first light according to an angle detecting control signal, and outputting a light sensing signal according to the first reflection light, wherein the first reflection light is generated from the reflection resulted when the first light illuminates the single hand;
   an image capturing module capturing at least one two-dimensional reference image of the single hand, and outputting the two-dimensional reference image, wherein the distance between the angle detecting module and the image capturing module is a fixed length; and
   a gesture information control module electrically connected to the first lighting module, the image capturing module and the angle detecting module, and the gesture information control module acquiring a first angle reference data and a second angle reference data respectively according to the light sensing signal and the two dimension reference image;
   wherein the gesture information control module calculates a depth data and a horizontal displacement data of the single hand according to the first angle reference data, the second angle reference data and the fixed length, so as to recognize gestures of the single hand;
   wherein the gesture information control module respectively transmits the first lighting control signal and the angle detecting control signal to the first lighting module and the angle detecting module.

2. The gesture recognition system according to claim 1, wherein the angle detecting module has an optical wavelength detecting range that is matching optical wavelength of the first light or a light detecting period that is matching lighting pulse period of the first light.

3. The gesture recognition system according to claim 1, wherein the gesture information control module comprises:
   an image control unit electrically connected to the image capturing module, and the image control unit receiving the two dimension reference image and accordingly calculating the second angle reference data;
   a first lighting control unit electrically connected to the first lighting module, the first lighting control unit outputting the first lighting control signal according to a first lighting instruction;
   an angle control unit electrically connected to the angle detecting module, the angle control unit receiving the light sensing signal and accordingly calculating the first angle reference data, wherein the angle control unit transmits the angle detecting control signal to the angle detecting module according to an angle detecting instruction; and
   a gesture recognition processing unit electrically connected to the image control unit, the first lighting control unit and the angle control unit, and the gesture recognition processing unit receiving the first angle reference data and the second angle reference data and calculating a depth data and a horizontal displacement data of the single hand according to the first angle reference data, the second angle reference data and the fixed length, so as to recognize single-hand gestures;

wherein the gesture recognition processing unit respectively transmits the first lighting instruction and the angle detecting instruction to the first lighting control unit and the angle control unit.

4. The gesture recognition system according to claim 1, further comprising:
at least one second lighting module for emitting a second light according to a second lighting control signal so as to expand an overall light illumination range of the gesture recognition system, wherein the second light has a second light illumination range;
wherein the angle detecting module further receives a second reflection light of the second light and outputs the light sensing signal according to the second reflection light, wherein the second reflection light is generated from the reflection resulted when the second light illuminates the single hand;
wherein the gesture information control module transmits the second lighting control signal to the second lighting module.

5. The gesture recognition system according to claim 4, wherein the gesture information control module further comprises:
at least one second lighting control unit electrically connected to the second lighting module and the gesture recognition processing unit, and the second lighting control unit outputting the second lighting control signal according to a second lighting instruction transmitted by the gesture recognition processing unit.

6. The gesture recognition system according to claim 4, wherein the angle detecting module has an optical wavelength detecting range that is matching optical wavelength of the first light and optical wavelength of the second light, or a light detecting period that is matching lighting pulse period of the first light and lighting pulse period of the second light.

7. The gesture recognition system according to claim 4, wherein the first light and the second light have the same optical wavelength, or the first light and the second light have the same lighting pulse period.

8. A gesture recognition system, recognizing two-hands gestures, comprising:
a first lighting module for emitting a first light according to a first lighting control signal, wherein the first light has a first light illumination range;
a third lighting module for emitting a third light according to a third lighting control signal, wherein the third light has a third light illumination range;
a first angle detecting module for receiving a first reflection light of the first light according to an first angle detecting control signal, and outputting a first light sensing signal according to the first reflection light, wherein the first reflection light is generated from the reflection resulted when the first light illuminates a first hand;
a second angle detecting module for receiving a third reflection light of the third light according to an second angle detecting control signal, and outputting a second light sensing signal according to the third reflection light, wherein the third reflection light is generated from the reflection resulted when the third light illuminates a second hand;
an image capturing module capturing at least one two-dimensional reference image of the first hand and the second hand, and outputting the two-dimensional reference image, wherein the distance between the first angle detecting module and the image capturing module is a first fixed length and the distance between the second angle detecting module and the image capturing module is a second fixed length; and
a gesture information control module electrically connected to the first lighting module, the third lighting module, the first angle detecting module, the second angle detecting module and the image capturing module, and the gesture information control module acquiring a first angle reference data and a second angle reference data respectively according to the first light sensing signal and the two dimension reference image and acquiring a third angle reference data and a fourth angle reference data respectively according to the second light sensing signal and the two-dimensional reference image;
wherein the gesture information control module calculates a first depth data and a first horizontal displacement data of the first hand according to the first angle reference data, the second angle reference data and the first fixed length and calculates a second depth data and a second horizontal displacement data of the second hand according to the third angle reference data, the fourth angle reference data and the second fixed length, so as to recognize gestures of the first hand and the second hand;
wherein the gesture information control module respectively transmits the first lighting control signal, the third lighting control signal, the first angle detecting control signal and the second angle detecting control signal to the first lighting module, the third lighting module, the first angle detecting module and the second angle detecting module.

9. The gesture recognition system according to claim 8, wherein the first angle detecting module has an optical wavelength detecting range that is matching optical wavelength of the first light or a light detecting period that is matching lighting pulse period of the first light, and the second angle detecting module has an optical wavelength detecting range that is matching optical wavelength of the third light or a light detecting period that is matching lighting pulse period of the third light.

10. The gesture recognition system according to claim 8, wherein the first light and the third light have different optical wavelengths, or the first light and the third light have different lighting pulse periods.

11. The gesture recognition system according to claim 8, wherein the gesture information control module comprises:
an image control unit electrically connected to the image capturing module, and the image control unit receiving the two-dimensional reference image and accordingly calculating the second angle reference data and the fourth angle reference data;
a first lighting control unit electrically connected to the first lighting module, and the first lighting control unit outputting the first lighting control signal according to a first lighting instruction;
a first angle control unit electrically connected to the first angle detecting module, and the first angle control unit receiving the first light sensing signal and accordingly calculating the first angle reference data, wherein the first angle control unit transmits the first angle detecting control signal to the first angle detecting module according to a first angle detecting instruction;
a third lighting control unit electrically connected to the third lighting module, and the third lighting control unit outputting the third lighting control signal according to a third lighting instruction;
a second angle control unit electrically connected to the second angle detecting module, and the second angle control unit receiving the second light sensing signal and accordingly calculating the third angle reference data, wherein the second angle control unit transmits the second angle detecting control signal to the second angle detecting module according to a second angle detecting instruction; and a gesture recognition processing unit electrically connected to the image control unit, the first lighting control unit, the third lighting control unit, the first angle control unit and the second angle control unit, and the gesture recognition processing unit receiving the first angle reference data, the second angle reference data, the third angle reference data and the fourth angle reference data;

wherein the gesture recognition processing unit calculates the first depth data and the first horizontal displacement data of the first hand according to the first angle reference data, the second angle reference data and the first fixed length, and calculates the second depth data and the second horizontal displacement data of the second hand according to the third angle reference data, the fourth angle reference data and the second fixed length, so as to recognize gestures of the first hand and the second hand;

wherein the gesture recognition processing unit respectively transmits the first lighting instruction, the third lighting instruction, the first angle detecting instruction and the second angle detecting instruction to the first lighting control unit, the third lighting control unit, the first angle control unit and the second angle control unit.

12. The gesture recognition system according to claim 8, further comprising:

at least one second lighting module for emitting a second light according to a second lighting control signal so as to expand an overall light illumination range of the gesture recognition system, wherein the second light has a second light illumination range; and at least one fourth lighting module for emitting a fourth light according to a fourth lighting control signal so as to expand an overall light illumination range of the gesture recognition system, wherein the fourth light has a fourth light illumination range;

wherein the first angle detecting module further receives a second reflection light of the second light and outputs the first light sensing signal according to the second reflection light, wherein the second reflection light is generated from the reflection resulted when the second light illuminates the first hand;

wherein the second angle detecting module further receives a fourth reflection light of the fourth light and outputs the second light sensing signal according to the fourth reflection light, wherein the fourth reflection light is generated from the reflection resulted when the fourth light illuminates the second hand;

wherein the gesture information control module transmits the second lighting control signal and the fourth lighting control signal to the second lighting module and the fourth lighting module.

13. The gesture recognition system according to claim 12, wherein the gesture information control module further comprises:

at least one second lighting control unit electrically connected to the second lighting module and the gesture recognition processing unit, and the second lighting control unit outputting the second lighting control signal according to a second lighting instruction transmitted by the gesture recognition processing unit; and at least one fourth lighting control unit electrically connected to the fourth lighting module and the gesture recognition processing unit, and the fourth lighting control unit outputting the fourth lighting control signal according to a fourth lighting instruction transmitted by the gesture recognition processing unit.

14. The gesture recognition system according to claim 12, wherein the first light and the second light have the same optical wavelength, or the first light and the second light have the same lighting pulse period.

15. The gesture recognition system according to claim 12, wherein the third light and the fourth light have the same optical wavelength, or the third light and the fourth light have the same lighting pulse period.

16. The gesture recognition system according to claim 12, wherein the first angle detecting module has an optical wavelength detecting range that is matching optical wavelength of the first light and optical wavelength of the second light or a light detecting period that is matching lighting pulse period of the first light and lighting pulse period of the second light, and wherein the second angle detecting module has an optical wavelength detecting range that is matching optical wavelength of the third light and optical wavelength of the fourth light or a light detecting period that is matching lighting pulse period of the third light and lighting pulse period of the fourth light.

17. A gesture recognition method, used in a gesture recognition system recognizing single-hand gestures, the gesture recognition system comprising a first lighting module, an angle detecting module, an image capturing module and a gesture information control module, the gesture information control module electrically connected to the first lighting module, the image capturing module and the angle detecting module, and the gesture recognition method comprising:

emitting a first light by the first lighting module according to a first lighting control signal, wherein the first light has a first light illumination range;

receiving a first reflection light of the first light by the angle detecting module according to an angle detecting control signal and outputting a light sensing signal according to the first reflection light, wherein the first reflection light is generated from the reflection resulted when the first light illuminates the single hand;

capturing at least one two-dimensional reference image of the single hand from the image capturing module, wherein the distance between the angle detecting module and the image capturing module is a fixed length;

acquiring a first angle reference data and a second angle reference data by the gesture information control module respectively according to the light sensing signal and the two-dimensional reference image; and calculating a depth data and a horizontal displacement data of the single hand by the gesture information control module according to the first angle reference data, the second angle reference data and the fixed length, so as to recognize single-hand gestures;

wherein the gesture information control module respectively transmits the first lighting control signal and the angle detecting control signal to the first lighting module and the angle detecting module.

18. The gesture recognition method according to claim 17, wherein the angle detecting module has an optical wavelength detecting range that is matching optical wavelength of the first light, or a light detecting period that is matching lighting pulse period of the first light.

19. The gesture recognition method according to claim 17, wherein the gesture information control module comprises:

an image control unit electrically connected to the image capturing module, and the image control unit receiving the two dimension reference image and accordingly calculating the second angle reference data;
a first lighting control unit electrically connected to the first lighting module, and the first lighting control unit outputting the first lighting control signal according to a first lighting instruction;
an angle control unit electrically connected to the angle detecting module, and the angle control unit receiving the light sensing signal and accordingly calculating the first angle reference data, wherein the angle control unit transmits the angle detecting control signal to the angle detecting module according to an angle detecting instruction; and
a gesture recognition processing unit electrically connected to the image control unit, the first lighting control unit and the angle control unit, and the gesture recognition processing unit receiving the first angle reference data and the second angle reference data and calculating a depth data and a horizontal displacement data of the single hand according to the first angle reference data, the second angle reference data and the fixed length, so as to recognize single-hand gestures;
wherein the gesture recognition processing unit respectively transmits the first lighting instruction and the angle detecting instruction to the first lighting control unit and the angle control unit.

20. The gesture recognition method according to claim 17, wherein the gesture recognition system further comprises:
at least one second lighting module for emitting a second light according to a second lighting control signal so as to expand an overall light illumination range of the gesture recognition system, wherein the second light has a second light illumination range;
wherein the angle detecting module further receives a second reflection light of the second light and outputs the light sensing signal according to the second reflection light, wherein the second reflection light is generated from the reflection resulted when the second light illuminates the single hand;
wherein the gesture information control module transmits the second lighting control signal to the second lighting module.

21. The gesture recognition method according to claim 20, wherein the gesture information control module further comprises:
at least one second lighting control unit electrically connected to the second lighting module and the gesture recognition processing unit, and the second lighting control unit outputting the second lighting control signal according to a second lighting instruction transmitted by the gesture recognition processing unit.

22. The gesture recognition method according to claim 20, wherein the angle detecting module has an optical wavelength detecting range that is matching optical wavelength of the first light and optical wavelength of the second light, or a light detecting period that is matching lighting pulse period of the first light and lighting pulse period of the second light.

23. The gesture recognition method according to claim 20, wherein the first light and the second light have the same optical wavelength, or the first light and the second light have the same lighting pulse period.

24. A gesture recognition method, used in a gesture recognition system for recognizing two-hands gestures, the gesture recognition system comprises a first lighting module, a third lighting module, a first angle detecting module, a second angle detecting module, an image capturing module and a gesture information control module, the gesture information control module electrically connected to the first lighting module, the third lighting module, the first angle detecting module, the second angle detecting module and the image capturing module, and the gesture recognition method comprising:
emitting a first light by the first lighting module according to a first lighting control signal wherein the first light has a first light illumination range;
emitting a third light by third lighting module the according to a third lighting control signal wherein the third light has a third light illumination range;
receiving a first reflection light of the first light by the first angle detecting module according to a first angle detecting control signal, and outputting a first light sensing signal according to the first reflection light, wherein the first reflection light is generated from the reflection resulted when the first light illuminates a first hand;
receiving a third reflection light of the third light by the second angle detecting module according to a second angle detecting control signal, and outputting a second light sensing signal according to the third reflection light, wherein the third reflection light is generated from the reflection resulted when the third light illuminates a second hand;
capturing at least one two-dimensional reference image of the first hand and the second hand by the image capturing module, and outputting the two-dimensional reference image, wherein the distance between the first angle detecting module and the image capturing module is a first fixed length and the distance between the second angle detecting module and the image capturing module is a second fixed length;
acquiring a first angle reference data and a second angle reference data respectively according to the first light sensing signal and the two-dimensional reference image by the gesture information control module, and acquiring a third angle reference data and a fourth angle reference data respectively according to the second light sensing signal and the two-dimensional reference image; and
calculating a first depth data and a first horizontal displacement data of the first hand according to the first angle reference data, the second angle reference data and the first fixed length by the gesture information control module, and calculating a second depth data and a second horizontal displacement data of the second hand according to the third angle reference data, the fourth angle reference data and the second fixed length by the gesture information control module, so as to recognize gestures of the second hand;
wherein the gesture information control module respectively transmits the first lighting control signal, the third lighting control signal, the first angle detecting control signal and the second angle detecting control signal to the first lighting module, the third lighting module, the first angle detecting module and the second angle detecting module.

25. The gesture recognition method according to claim 24, wherein the first angle detecting module has an optical wavelength detecting range that is matching optical wavelength of the first light or a light detecting period that is matching lighting pulse period of the first light, and the second angle detecting module has an optical wavelength detecting range that is matching optical wavelength of the third light or a light detecting period that is matching lighting pulse period of the third light.

26. The gesture recognition method according to claim 24, wherein the first light and the third have different optical wavelengths, or the first light and the third have different lighting pulse periods.

27. The gesture recognition method according to claim 24, wherein the gesture information control module comprises:
an image control unit electrically connected to the image capturing module, and the image control unit receiving the two dimension reference image and accordingly calculating the second angle reference data and the fourth angle reference data;
a first lighting control unit electrically connected to the first angle detecting module, the first lighting control unit outputting the first lighting control signal according to a first lighting instruction;a first angle control unit electrically connected to the first angle detecting module, and the first angle control unit receiving the first light sensing signal and accordingly calculating the first angle reference data, wherein the first angle control unit transmits the first angle detecting control signal to the first angle detecting module according to a first angle detecting instruction;
a third lighting control unit electrically connected to the third lighting module, and the third lighting control unit outputting the third lighting control signal according to a third lighting instruction;
a second angle control unit electrically connected to the second angle detecting module, and the second angle control unit receiving the second light sensing signal and accordingly calculating the third angle reference data, wherein the second angle control unit transmits the second angle detecting control signal to the second angle detecting module according to a second angle detecting instruction; and
a gesture recognition processing unit electrically connected to the image control unit, the first lighting control unit, the third lighting control unit, the first angle control unit, the second angle control unit and the image control unit, and the gesture recognition processing unit receiving the first angle reference data, the second angle reference data, the third angle reference data and the fourth angle reference data;
wherein the gesture recognition processing unit calculates the first depth data and the first horizontal displacement data of the first hand according to the first angle reference data, the second angle reference data and the first fixed length, and calculates the second depth data and the second horizontal displacement data of the second hand according to the third angle reference data, the fourth angle reference data and the second fixed length, so as to recognize gestures of the first and the second hand;
wherein the gesture recognition processing unit respectively transmits the first lighting instruction, the third lighting instruction, the first angle detecting instruction and the second angle detecting instruction to the first lighting control unit, the third lighting control unit, the first angle control unit and the second control unit.

28. The gesture recognition method according to claim 24, further comprising:
at least one second lighting module for emitting a second light according to a second lighting control signal so as to expand an overall light illumination range of the gesture recognition system, wherein the second light has a second light illumination range; and
at least one fourth lighting module for emitting a fourth light according to a fourth lighting control signal so as to expand an overall light illumination range of the gesture recognition system, wherein the fourth light has a fourth light illumination range;
wherein the first angle detecting module further receives a second reflection light of the second light, and outputs the first light sensing signal according to the second reflection light, where the second reflection light is generated from the reflection resulted when the first light illuminates the first hand;
wherein the second angle detecting module further receives a fourth reflection light of the fourth light, and outputs the second light sensing signal according to the fourth reflection light, wherein the fourth reflection light is generated from the reflection resulted when the first light illuminates the second hand;
wherein the gesture information control module transmits the second lighting control signal and the fourth lighting control signal to the second lighting module and the fourth lighting module.

29. The gesture recognition method according to claim 28, wherein the gesture information control module further comprises:
at least one second lighting control unit electrically connected to the second lighting module and the gesture recognition processing unit, the second lighting control unit outputting the second lighting control signal according to a second lighting instruction transmitted by the gesture recognition processing unit; and
at least one fourth lighting control unit electrically connected to the fourth lighting module and the gesture recognition processing unit, the fourth lighting control unit outputting the fourth lighting control signal according to a fourth lighting instruction transmitted by the gesture recognition processing unit.

30. The gesture recognition method according to claim 28, wherein the first light and the second light have the same optical wavelength, or the first light and the second light have the same lighting pulse period.

31. The gesture recognition method according to claim 28, wherein the third light and the fourth light have the same optical wavelength, or the third light and the fourth light have the same lighting pulse period.

32. The gesture recognition method according to claim 28, wherein the first angle detecting module has an optical wavelength detecting range that is matching optical wavelength of the first light and optical wavelength of the second light or the first angle detecting module has a light detecting period that is matching lighting pulse period of the first light and lighting pulse period of the second light, and wherein the second angle detecting module has an optical wavelength detecting range that is matching optical wavelength of the third light and optical wavelength of the fourth light or the second angle detecting module has a light detecting period that is matching lighting pulse period of the third light and lighting pulse period of the fourth light.

* * * * *